(12) United States Patent
Dermosessian

(10) Patent No.: US 10,990,907 B2
(45) Date of Patent: *Apr. 27, 2021

(54) ELECTRONIC PARKING INFRASTRUCTURE WITHOUT DETECTORS OR SENSORS

(71) Applicant: Raphael Dermosessian, Montreal (CA)

(72) Inventor: Raphael Dermosessian, Montreal (CA)

(*) Notice: Subject to any disclaimer, the term of this patent is extended or adjusted under 35 U.S.C. 154(b) by 422 days.

This patent is subject to a terminal disclaimer.

(21) Appl. No.: 15/406,119

(22) Filed: Jan. 13, 2017

(65) Prior Publication Data

US 2017/0206473 A1    Jul. 20, 2017

Related U.S. Application Data

(63) Continuation-in-part of application No. 14/996,184, filed on Jan. 14, 2016, now Pat. No. 10,026,042.

(51) Int. Cl.

| | |
|---|---|
| *G06Q 10/02* | (2012.01) |
| *G06Q 30/02* | (2012.01) |
| *G06Q 20/22* | (2012.01) |
| *G06Q 50/30* | (2012.01) |
| *G08G 1/14* | (2006.01) |

(52) U.S. Cl.
CPC .............. *G06Q 10/02* (2013.01); *G06Q 20/22* (2013.01); *G06Q 30/0267* (2013.01); *G06Q 50/30* (2013.01); *G08G 1/144* (2013.01); *G06Q 2240/00* (2013.01)

(58) Field of Classification Search
CPC .... G06Q 10/02; G06Q 50/30; G06Q 20/3224; G06Q 30/0267; G08G 1/14; G08G 1/142; G08G 1/144; G08G 1/143; G08G 1/012; G07F 17/0021

USPC .................................. 705/5, 13; 340/932.2
See application file for complete search history.

(56) References Cited

U.S. PATENT DOCUMENTS

| | | | |
|---|---|---|---|
| 7,956,769 B1* | 6/2011 | Pearl ........................ | G08G 1/14 340/539.1 |
| 10,026,042 B2* | 7/2018 | Dermosessian .... | G01C 21/3679 |
| 2002/0116235 A1 | 8/2002 | Grimm | |

(Continued)

FOREIGN PATENT DOCUMENTS

WO    WO-9719568 A1 *    5/1997    ............. G07B 15/02

OTHER PUBLICATIONS

Meriam-Webster definition of aggregation <https://www.merriam-webster.com/dictionary/aggregation> (Year: 2019).*

(Continued)

*Primary Examiner* — Michael P Harrington
*Assistant Examiner* — Brian A Tallman
(74) *Attorney, Agent, or Firm* — Benoit & Cote, Inc.; C. Marc Benoit

(57) ABSTRACT

There is described an electronic parking infrastructure without detectors or sensors. The electronic parking infrastructure comprises geo-located parking spaces, a parking system database and a computing device which communicates over a communication network. The computing device has a computer/processor, applications can be loaded thereon, it is web-enabled and it has an on-board positioning system. The positioning system of the computing device is used in conjunction with the position of geo-located parking space to determine if a vehicle occupies the geo-located parking space.

20 Claims, 10 Drawing Sheets

(56) References Cited

U.S. PATENT DOCUMENTS

| | | | |
|---|---|---|---|
| 2003/0092387 A1* | 5/2003 | Hjelmvik | G06Q 20/127 455/41.1 |
| 2003/0144890 A1 | 7/2003 | Dan | |
| 2004/0181439 A1 | 9/2004 | Kakuta | |
| 2007/0129974 A1 | 6/2007 | Chen | |
| 2010/0019862 A1 | 8/2010 | Cho | |
| 2011/0022427 A1 | 1/2011 | Dayan | |
| 2012/0095792 A1* | 4/2012 | Stefik | G06Q 10/02 705/5 |
| 2012/0143639 A1 | 6/2012 | Rollert | |
| 2012/0265434 A1* | 10/2012 | Woodard | G08G 1/144 701/423 |
| 2013/0124270 A1* | 5/2013 | Tziperman | G07B 15/02 705/13 |
| 2013/0265174 A1* | 10/2013 | Scofield | G01C 21/34 340/932.2 |
| 2013/0290045 A1 | 10/2013 | Levy | |
| 2013/0346121 A1 | 12/2013 | Shealy | |
| 2014/0089015 A1* | 3/2014 | Stefik | G06Q 10/08 705/5 |
| 2014/0089016 A1 | 3/2014 | Smullin | |
| 2014/0149153 A1 | 5/2014 | Cassandras | |
| 2015/0130642 A1* | 5/2015 | Huang | B62D 15/028 340/932.2 |
| 2016/0133085 A1* | 5/2016 | Eagon | G06Q 20/127 705/13 |

OTHER PUBLICATIONS

Sauras-Perez, Pablo, Andrea Gil, and Joachim Taiber. "Parkingain: Toward a smart parking application with value-added services integration." 2014 International Conference on Connected Vehicles and Expo (ICCVE). IEEE, 2014. (Year: 2014).*
http://spthero.com/search [Jun. 13, 2014].
http://vancouver.ca/streets-transportation/reserve-metered-spaces.aspx [Apr. 15, 2014].
http://www.businessinsider.com/the-10-hottest-apps-in-may-2014-5-5?op=1 [Jun. 13, 2014].
Improved Prepayment in San Francisco [Apr. 15, 2014].
moneyparking.striningly.com/ [Jun. 13, 2014].
www.neoparking.com/paris [Jun. 13, 2014].

* cited by examiner

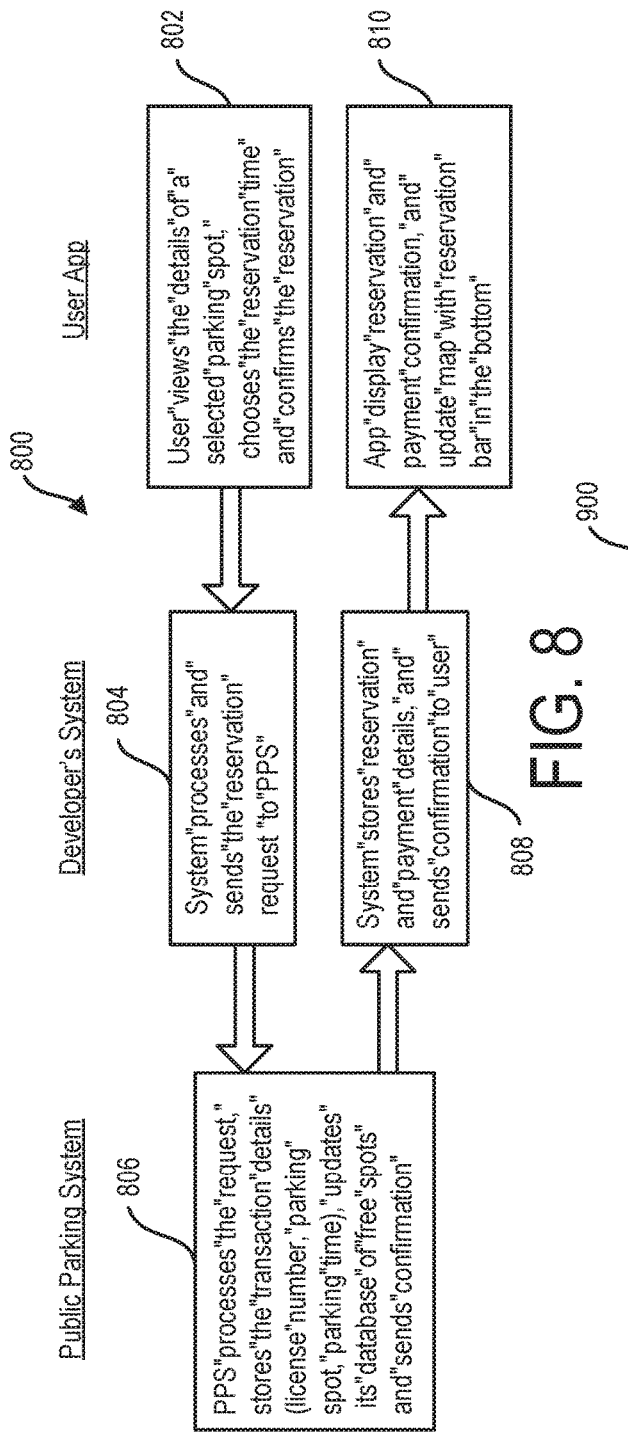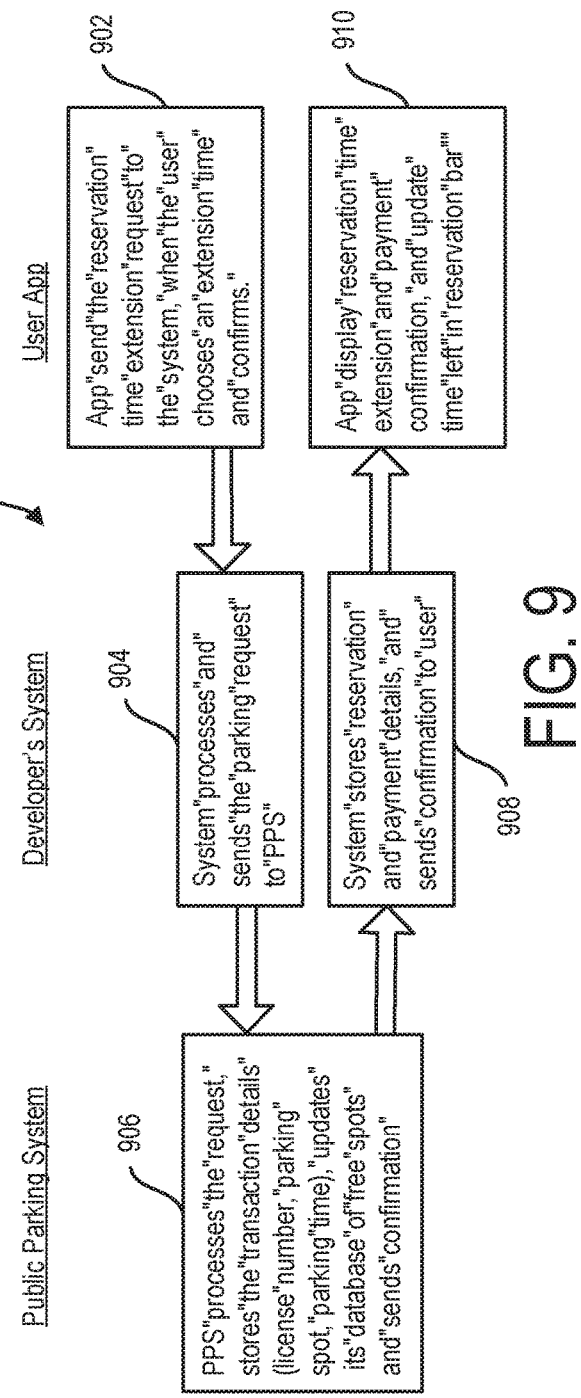
FIG. 8
FIG. 9

ELECTRONIC PARKING INFRASTRUCTURE WITHOUT DETECTORS OR SENSORS

CROSS-REFERENCE TO RELATED APPLICATIONS

This application is a continuation-in-part of U.S. patent application Ser. No. 14/996,184, filed Jan. 14, 2016, which is hereby incorporated by reference in its entirety.

BACKGROUND

(a) Field

The subject matter disclosed generally relates to relates to an electronic parking infrastructure without detectors or sensors.

(b) Related Prior Art

Most major cities around the globe are turning parking spaces into rentable bike systems in an effort to make the cities less congested with traffic and to reduce pollution. This has proven to be a nuisance to those who need to find a parking space for their cars especially when a person is short on time.

In an effort to transform major North American cities into Eco-Friendly environment, several measures have been taken to reduce carbon emissions, in addition to optimizing available systems.

Under the pretext of "optimization", the presently described parking space reservation system was developed.

SUMMARY

In the present description, the terms hereunder can be understood according to and in the context of the definitions given hereto.

Parking space: a physical space which can be occupied by a vehicle and which is geo-located by two- or three-dimensional coordinates. Each parking space has a unique ID which is stored in a parking system database.

Computing device: is a device which has, according to an embodiment, the following features: it has a computer/processor, applications can be loaded thereon, it is web-enabled and it has an on-board positioning system.

Mobile computing device: is a type of computing device which can be carried by a user and which has the same features as a computing device as defined herein; e.g., a smart phone, a tablet, phablet, a portable computer, etc. In some examples in the present description, a mobile computing device only is described. Where applicable the description also encompasses a computing device in the broader sense.

Vehicle: any device which can carry a user, or any other type of payload, and a computing device.

Starting location: is the location which corresponds to the starting point from which the travel time (actual or estimated) is determined.

Actual travel time. The time it actually takes for a user to travel from the place where the user is determined to be located when he performs a selection of (or request for) on his computing device, a parking space for reservation to the selected parking space. Alternatively, it is the time it actually takes for a user to travel from a place determined by the user on his computing device to the selected parking space.

Estimated travel time. The "estimated travel time" is computed or calculated (via a processor) using the starting location relative to the location of a pre-defined geo-located parking space. According to an embodiment, the "estimated travel time" is computed or calculated (via a processor) using the position of the computing device as determined by the positioning system of the computing device relative to the location of a pre-defined geo-located parking space. Alternatively, the "estimated travel time" is computed using a position determined by the user on the computing device relative to the location of a pre-defined geo-located parking space. According to an embodiment, the "estimated travel time" can include time to get to the vehicle (walking, elevator, etc.) from the position of the computing device when the selection of the parking space is made and the subsequent time to travel in the vehicle to the parking space taking into account traffic (real-time, estimated, present/actual, future, etc.).

Initial occupation period: a period which is proposed on a user interface of a mobile device to the user as a period during which the vehicle could occupy a selected parking space.

Revised occupation period: after the "initial occupation period" is proposed to the user, her may modify it (i.e., its duration), still on the user interface, to a "revised occupation period". After the vehicle arrives at the parking space, the user may again be given the opportunity to modify the "revised occupation period" for a new "revised occupation period" based on the time he believes he will need the parking space. A time limit on the "revised occupation period" and the "initial reservation period" can be imposed by the system. An amount to be paid will be calculated based on the "revised occupation period" (or the "initial occupation period" if it was not changed).

Occupation period: a period during which a vehicle actually occupies a parking space. It may be the same or different from the "revised occupation period" (i.e., longer or shorter). Depending on whether it is longer or shorter, a supplement may be charged (if longer) or a credit can be paid (if shorter). The "occupation period" is concurrent with the "occupied" status of a parking space defined below. Depending on the difference between the actual travel time and the estimated travel time and the revised occupation period, the occupation period may start earlier or later than what was estimated.

Initial reservation period: a period before the occupation period. The "initial reservation period" is not concurrent with the "occupation period". The "initial reservation period" starts when the user accepts, on the user interface, to reserve a parking for the "initial reservation period" before the planned occupancy of the parking space by a vehicle. The "initial reservation period" ends when the status of the parking space changes from "unoccupied" to "occupied". The "initial reservation period" is normally the period allowed between the time a user selects an unreserved parking space (thereby changing the status to reserved) and the time the vehicle for which a reservation was made occupies the reserved parking space. The "initial reservation period" therefore includes the travel time of the vehicle from the space it occupies when the user selects a parking space to the reserved parking space. The "initial reservation period" may be extended or reduced as detailed herein. Within certain limits (detailed herein), another vehicle can occupy a parking space during the "initial reservation period"; i.e., while is it "reserved and unoccupied". The "initial reservation period" for a parking space is a "reservation period" in that no other user of the system may reserve the same parking space. The parking space will not show up on the user interface as being available for reservation. It is "initial" in the sense that it is initially calculated based on the "estimated travel time". The "initial reservation period" is presented on a user interface of the computing device to the user and can be modified or revised (i.e., extended or reduced) and therefore it can change from being an "initial reservation period" to a "revised reservation period". Notwithstanding the above, it is possible that, within certain time limits detailed herein, another vehicle can occupy a reserved parking space. During the "initial reservation period", a parking space could therefore be occupied by another vehicle. To recap, the "initial reservation period" and the "occupation period" are separate and distinct from each other. The "initial reservation period" is calculated by a machine based on the estimated travel time and is not determined by a user. Once the "initial reservation period" is proposed to the user, it can be accepted as is or the user can change it according to his needs.

Selected parking space: the status of a parking space which has been selected (or requested) by a user on a user interface. The status of a parking space can be "selected and unreserved". Normally, when the status of a parking space changes to "reserved", the "selected" status is not useful and is not used as such.

Reserved parking space: the status of a parking space when the user accepts the conditions for reserving the parking space. Normally, a parking space is "selected" before it is reserved. However, in some embodiments, these steps occur simultaneously. Normally, an occupied space is not available for selection or reservation.

Unreserved parking space: the status of a parking space when it is not "reserved". When a vehicle leaves a parking space, the "occupation period" ends and the status changes to "unoccupied and unreserved". It is therefore again available for selection and reservation.

Occupied parking space: the status of a parking space which is being physically occupied by a vehicle. According to an embodiment, the status of occupancy of a parking space is triggered when the positioning system of the computing device is within a given/preset range of the reserved and unoccupied parking space which is geo-located; i.e., there is a match between the location of the positioning system of the computing device and the geo-location of the reserved and unoccupied parking space. An additional criterion is the speed which needs to be null or close to zero during a given period while there is a match in geo-location the computing device and the reserved and unoccupied parking space.

Unoccupied parking space: the status of a parking space which is not being physically occupied by a vehicle for which the parking space is intended (i.e., for which it is reserved). The status of a parking space changes from occupied to unoccupied (and unreserved) after the system detects/determines/computes that there is again a match (this time between the location of the positioning system of the computing device and the geo-location of the occupied parking space; i.e., the user carrying the computing device returned to the vehicle) and then, that there is no match and that the computing device, within a given period, is travelling at a speed which is normal for the vehicle (i.e., abnormal/higher than the normal speed for the user which is not in the moving vehicle). According to an embodiment, the mobile application will ask, through the user interface of the computing device, for confirmation that the vehicle has left the occupied parking space.

More details on the definitions above are provided hereinbelow.

Prior art systems require the installation of fixed physical indicators (e.g., a light that change color, a changing panel, etc.) to indicate if an unoccupied parking space is reserved or unreserved. The technical solutions to these technical problems are discussed and disclosed herein.

In some embodiments, the technical solutions include the use of geo-location information (e.g., coordinate information) for each parking space which is stored in a parking system database. The parking system database can be operated by public authorities (e.g., a city). The technical solutions may also include the use of the positions systems of web-enabled computing devices (which include computing devices). The foregoing positioning systems are involved in calculating a reservation period to being confirmed by a user. The use of fixed physical indicators is thereby rendered unnecessary. According to an embodiment, the present system works without using fixed physical indicators.

The proposed technical solutions also provide information about the status of the parking spaces; e.g., reserved, unreserved, occupied, unoccupied, etc. or any logical combination thereof that is updated on a continuous basis.

In other embodiments, the technical solutions described herein include the use of positioning systems in each vehicle.

Another technical problem with prior art systems for reserving parking spaces is that there is a need to install and to use fixed physical sensors (weight sensors, light (or other wavelength) emission/detection sensors, cameras, etc.) for each parking space to determine if a parking space is occupied or not. The technical solution to this problem involves the comparison of the position given by the positioning system (of the web-enabled computing device or of the vehicle) with the geo-location information for a given (e.g., selected) parking space. According to an embodiment, the present system works without using fixed physical sensors.

With the increased effort in all major cities to reduce cars in the city to minimize traffic and pollution, the parking space reservation system described herein will help better manage and optimize the availability and use of parking spaces in the city. The parking space reservation system described herein will implement a method to better manage and optimize the availability and use of parking spaces in the city.

This concept is based on a system that links available public facilities/services and connects them to a specialized web based server to deliver a service that will make a commuter's life more efficient.

It is understood that the method and system described herein are time-sensitive. The machines and computers described in the claims (whether method, device, apparatus or system claims) are essential components thereof. A person or a group of persons cannot perform the claimed method or replace the machines or computers described herein to produce the claimed results in a period which is commercially and/or technical useful or logical.

According to an embodiment, each step which is stated to be performed by a machine, a processor, a computer, etc. is performed in less than 60 seconds.

According to an embodiment, each step which is stated to be performed by a machine, a processor, a computer, etc. is performed in less than 50 seconds.

According to an embodiment, each step which is stated to be performed by a machine, a processor, a computer, etc. is performed in less than 40 seconds.

According to an embodiment, each step which is stated to be performed by a machine, a processor, a computer, etc. is performed in less than 30 seconds.

According to an embodiment, each step which is stated to be performed by a machine, a processor, a computer, etc. is performed in less than 20 seconds.

According to an embodiment, each step which is stated to be performed by a machine, a processor, a computer, etc. is performed in less than 10 seconds.

According to an embodiment, each step which is stated to be performed by a machine, a processor, a computer, etc. is performed in less than 1 second.

According to an embodiment, each step which is stated to be performed by a machine, a processor, a computer, etc. is performed in less than 100 milliseconds.

According to an embodiment, each step which is stated to be performed by a machine, a processor, a computer, etc. is performed in less than 10 milliseconds.

According to an embodiment, each step which is stated to be performed by a machine, a processor, a computer, etc. is performed in less than 1 millisecond.

According to an embodiment, at least one step which is stated to be performed by a machine, a processor, a computer, etc. is performed in less than 1 second.

According to an embodiment, at least one step which is stated to be performed by a machine, a processor, a computer, etc. is performed in less than 100 milliseconds.

According to an embodiment, at least one step which is stated to be performed by a machine, a processor, a computer, etc. is performed in less than 10 milliseconds.

According to an embodiment, at least one step which is stated to be performed by a machine, a processor, a computer, etc. is performed in less than 1 millisecond.

According to an embodiment, there at least 10 unique ID's corresponding to 10 parking spaces stored in the parking system database.

According to an embodiment, there at least 50 unique ID's corresponding to 50 parking spaces stored in the parking system database.

According to an embodiment, there at least 100 unique ID's corresponding to 100 parking spaces stored in the parking system database.

According to an embodiment, there at least 500 unique ID's corresponding to 500 parking spaces stored in the parking system database.

According to an embodiment, there at least 1,000 unique ID's corresponding to 1,000 parking spaces stored in the parking system database.

According to an embodiment, there at least 5,000 unique ID's corresponding to 5,000 parking spaces stored in the parking system database.

According to an embodiment, there at least 10,000 unique ID's corresponding to 10,000 parking spaces stored in the parking system database.

According to an embodiment, there at least 50,000 unique ID's corresponding to 50,000 parking spaces stored in the parking system database.

According to an embodiment, the distance from the starting location to the selected unreserved parking space is at least 50 meters.

According to an embodiment, the distance from the starting location to the selected unreserved parking space is at least 100 meters.

According to an embodiment, the distance from the starting location to the selected unreserved parking space is at least 500 meters.

According to an embodiment, the distance from the starting location to the selected unreserved parking space is at least 1000 meters.

According to an embodiment, the distance from the starting location to the selected unreserved parking space is at least 5 kilometers.

According to an embodiment, the distance from the starting location to the selected unreserved parking space is at least 10 kilometers.

According to an embodiment, the distance from the starting location to the selected unreserved parking space is at least 50 kilometers.

According to an embodiment, the distance from the starting location to the selected unreserved parking space is at least 100 kilometers.

According to an embodiment, the distance from the starting location to the selected unreserved parking space is at least 500 kilometers.

According to an embodiment, the distance from the starting location to the selected unreserved parking space is at least 1000 kilometers.

The intention is that the present claims specifically do not cover any embodiment where machines or computers are not involved. In fact, the present claims specifically exclude embodiments where only humans, calculations performed in the human mind or with a pen and paper are involved. Also, it is emphasized that all embodiments described herein are not abstract, but real and embodied on physical machines. Only the embodiments which would involve only humans are abstract, unrealizable, unrealistic and the figment of one's imagination.

It should also be noted that subject matter eligibility, novelty and inventiveness of the claims submitted herein is not found in the individual elements of the claims, but rather in the combination of the elements of the claims. The individual steps performed by the machines described herein, may not be new by themselves/individually. However, their ordered combination may not be found in the prior art and hence they provide substantially more. The inventive concept can be found in the non-conventional and non-generic arrangement of known, conventional pieces.

The present description and claims propose a technical solution to a technical problem. In this case, one of the resolved technical problems is the fact that existing solutions propose to use fixed indicators to show reservation status of a parking space and fixed sensors to detect occupancy (or not) of a parking space. The indicators and sensors used in the prior art will eventually fail, need to be replaced, need a power source, are unreliable (e.g., in harsh weather conditions, heat, cold, snow, rain, etc.), and service will be interrupted when road work is performed in the vicinity of the parking spaces. Furthermore, the common characteristic of such indicators and sensors is that they are fixed.

Some would argue that the above noted problems will also be present in the claimed method since the computing devices also have these technical limits. The Applicant would disagree with such an argument. The fact is that, in the prior art, fixed sensors and indicators as well as positioning devices and databases are used. There are therefore more points of potential failure in the prior art systems and methods than there are in the instant claims. In the prior art systems, if a fixed sensor or indicator related to a parking space fails, the parking space is no longer available for use. This is not an issue in the instant description. In the presently described method, if failure of a computing device occurs, all parking spaces can still be used and the user can simply use another computing device to access the system and to apply the claimed method.

Some would also argue that the advantages provided by the present system and method represent more a business limits (e.g. flexibility, mobility) than a technical limit (i.e. functionality). The Applicant would also disagree with such an argument. As stated above, there are more points of potential failure in the prior art systems and methods than there are in the presently described system and method. This is a technical limit of the prior art systems and the claimed method proposes a novel and non-obvious ordered combination (significantly more) which provides functionality to overcome the prior art technical limit.

The claimed technical solution proposes a method of using the positioning device of a computing device in a new way to determine the occupancy status of a parking space and thereby eliminate the need for the fixed indicators and sensors. That is, the fixed indicators and sensors which each uniquely identify a single parking space are eliminated as a result of the steps of the claimed method which comprises the use of the computing devices of each user interacting with the positioning system and the parking system database. Stated otherwise, the ordered combination of limitations of the claimed method embodied in the system that includes the computing devices, the positioning system and the parking system database provides a new technical solution that eliminates the need for the fixed indicators and sensors of the prior art.

As illustrated in FIG. 14 and the claims, the new technical solution provides a means of cycling the status of parking spaces from unreserved (and unoccupied) to selected reserved (unoccupied) to reserved (and unoccupied) to occupied and back to unoccupied (i.e., unreserved) to start the cycle again indefinitely by eliminating fixed indicators and sensors required in the prior art.

As is illustrated herein, the claimed method is not directed to the idea of a parking reservation management method simply applied to the Internet or embodied in known computer technology. It is significantly more.

The Applicant would therefore disagree with any argument stating that the claimed method is representative of both an idea of itself—a mental process that can be performed in the human mind or by a human using pen and paper (i.e. a human observes or receives information about a vehicle's location and a reservation request and then creates a reservation, a human observes that a vehicle is or is not in a parking space), and also of a method of organizing human activities—a concept relating to interpersonal an intrapersonal activities, such as managing relationships or transactions between people . . . sales activities (i.e. reservations).

The Applicant purports that the claimed method and system are directed to something more specific and narrower than what is proposed above: the specific implementation of reserving a parking space for a vehicle set forth in the claim limitations. Specifically, the claimed method and system are directed to the more specific problem of reducing the points of failure in the systems by proposing a system that uses the positioning system of a computing device, a wireless communication network and a parking system database for cycling the status of parking spaces from unreserved (and unoccupied) to selected reserved (unoccupied) to reserved (and unoccupied) to occupied and back to unoccupied (i.e., unreserved) to start the cycle again and thereby eliminate the need for fixed sensors and detectors which are required in the prior art.

The non-conventional and non-generic arrangement of known, conventional pieces proposed in the claims uses the positioning system of a computing device, a wireless communication network and a parking system database for cycling the status of parking spaces from unreserved (and unoccupied) to selected reserved (unoccupied) to reserved (and unoccupied) to occupied and back to unoccupied (i.e., unreserved) to start the cycle again without relying on fixed sensors and detectors which are required in the prior art and thereby provides the advantage of reducing the potential points of failure in the parking reservation system. This reduction in the number of parts in a parking reservation system is technical in nature just like reducing the number of parts in a machine would be. In this case, it is the system to which the method applies which requires less parts.

It is further submitted that the claimed ordered combination of elements does not pre-empt all parking reservation methods or systems. While prior art systems and methods propose to use computing devices, a wireless communication network and a parking system databases, they do not propose the specific ordered combination of steps to provide the above-note advantages without using fixed detectors and sensors. On the other hand, the claims carve out a specific method and system which provides the above-noted technologically significant advantages.

The limitations noted above, when taken as an ordered combination, provide unconventional steps that confine the abstract idea of managing a parking space to a particular useful application which eliminates the need for fixed indicators and sensors.

The fact that the claimed method and system considered as a whole (i.e., the ordered combination of claimed steps) result in eliminating the fixed sensors of the prior art meaningfully limits the method of reserving a parking space and furthermore adds a specific limitation other than what is well-understood, routine, conventional activity in the field or unconventional steps that confine the claim to a particular useful application (i.e., one that eliminates the fixed sensors and thereby resolves the drawbacks related to fixed sensors such as being prone to failure, needing replacement, needing a power source, and being unreliable and provides that advantages of enhanced reliability, using less components and resources in the parking reservation system, and providing a system that provides technical advantages over prior art systems).

This concept will primarily help the application users to reserve a parking space without going into the hassle of finding their requirement physically, particularly in rush hours, tight schedules and harsh weather conditions. The system will serve as a platform that executes a series of steps of a process that will enable the user to find a convenient parking space remotely that will optimize both his circulation and inner city traffic.

This concept will help identify all available (i.e., unoccupied) parking spaces within the vicinity of the user's parking requirement within his immediate circle, within a set radius determined by the user, and a different location.

The presently described concept can work without the use of fixed sensors installed for each parking space. This is made possible by using the geo-location information for each parking space which is stored in the parking system database. The parking system database can be operated by public authorities (e.g., a city).

Also, the positioning system of a web-enabled computing device used to make the reservation (the web-enabled computing device normally being carried by the user who made the reservation and who is present in the vehicle that is being parked) is also used to determine the position of the web-enabled computing device (which is assimilated to be the position of the vehicle). In another embodiment, vehicles are equipped with their own positioning system thereby simplifying the determination of the position of the vehicle. In both previously described vehicle positioning methods, each vehicle has a unique ID which is stored in a parking system database. Furthermore, each of the parking spaces is uniquely identified and is geo-located. By comparing the position of the vehicle with the location of parking space, it is possible to determine whether a vehicle is parking in the space which was reserved for it.

It is also possible to reserve a parking space for a pre-set amount of time, e.g., 15 minutes by paying a small fee that will then be included in the total price to pay. A parking space can be reserved based on the user's plans, provided that he is allowed to reserve one parking space at a time; e.g., if the user has a meeting at a preset time, and at a defined location, he can reserve his most convenient parking space ahead of time. However, limitations are pre-set in the application, depending on the city of operations and the city's by-laws along with the city council's agreement to prevent abuse.

If the space is reserved and another person tries to pay by at the parking meter, he will be notified that it is reserved. If a person is paying with the local application/or street meter then the application will notify him as well, he then will have to move his car as priority is given to who has paid earlier.

In case the reserved parking space is occupied by another car, the person will have a report option, where he can notify authorities of this illegal occupation of his reserved parking space where the city can issue a ticket, and in turn give that person free parking in the next available parking space, and in the case of none availability, a credit note for use in the next reservation. This will discourage people of occupying reserved space, and be a source of income added to the city. Additionally, if the wrong car or person, parks in the parking space, the system can directly notify the authorities.

For safety reasons, the software will not allow you to use the system or reserve if the car is in motion, which will be determined by the GPS/positioning system readily available in all smart phones.

The system will help locate any car since the use of the system will require the registration of your car details (data collection, DUI parolee, etc.) thus being able to automatically know if a person is breaching his parole.

Payment will be processed once the reservation is performed.

Once a person performs a reservation and he does not arrive and pay for the parking space within the reservation time, the charged amount for reservation will be retained.

The system described herein is compatible with a notification system, such as LED lights, is installed on parking poles, when flashing yellow it means it is reserved so another person wishing to park will be notified and avoid inconvenience. The notification system present on each pole indicates the status of occupancy whether reserved or free.

This application is compatible with available interfaces; e.g., Car Navigation systems. This system relies on available and future operating systems or technology. Most cars are equipped with navigation systems, and an option will be introduced where the navigation system will find the nearest available space within the estimated time of arrival and reserve it for you.

This will apply to, but not limited, to systems such as: GOOGLE® MAPS, GARMIN®, etc.

Companies and other establishments are able to "sponsor" parking spaces using the system. The concept will provide the option to shops surrounding the parking space to "sponsor" the parking spaces.

The sponsors pay for the reserved parking spaces when the customer arrives, and when the customer comes to pay for the parking, he will be notified that this parking space has been paid for by the sponsor.

Sponsorship strategies are decided by the sponsoring companies and establishments, such as email advertising, newsletter, offers, and promotion and the like.

In turn, the sponsor will automatically email advertising, newsletters, offers, and promotions, etc., to the client.

This application will be particular city specific, i.e., it will be adapted to the laws and regulation of specific cities (aka authorities).

According to an embodiment, there is described a method for reserving a parking space for a vehicle using a computing device having a display, a user interface and a positioning system. The method comprises: requesting, on the user interface and while the computing device is at a present location, an unreserved parking space from a plurality of unreserved parking spaces thereby defining a selected unreserved parking space, the unreserved parking spaces being in a location which is different from the present location; using the positioning system, computing an estimated travel time from the present location of the computing device to the selected unreserved parking space; based on the estimated travel time, automatically calculating, and proposing on the user interface, an initial reservation period for the selected unreserved parking space; accepting, on the user interface, the initial reservation period; and upon the accepting, generating and transmitting, from the computing device, a reservation signal to a parking system database, the reservation signal comprising an ID of, and the initial reservation period for, the selected unreserved parking space and instructions for changing a status of the selected parking space from unreserved to reserved in the parking system database.

According to an aspect, the method further comprises accessing, using the computing device, the parking system database to obtain: a status of parking spaces indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location (coordinates) of each of the unoccupied parking spaces.

According to an aspect, the initial reservation period is greater than the estimated travel time by a set time margin.

It should be understood that "parking system database" is meant to be interpreted broadly here. It can encompass a parking system, a parking system server, a parking system web server, a parking system website, etc. In general, it is meant to include any device or system which stores the information/data related to the plurality of parking spaces from which a parking space can be selected. Its physical location is not a limiting factor in the proposed technical solutions.

According to an aspect, the method further comprises providing, on the user interface, an option to select a revised reservation period which is different from the initial reservation period.

According to an aspect, a difference between the revised reservation period and the initial reservation period is not greater than a limit time margin thereby preventing reservation of a selected unreserved parking space beyond a given threshold period.

According to an aspect, the method further comprises, during the initial reservation period or the revised reservation period, generating and transmitting, from the computing device, an occupation signal to the parking system database, the occupation signal comprising the ID of the selected reserved parking space and instructions for changing the status of the selected parking space from reserved to occupied for an occupation period in the parking system database.

According to an aspect, the method further comprises registering an identity for each of a plurality of vehicles on the parking system database wherein the reservation signal comprises a vehicle identity which is matched to the ID of the selected parking space for which the status is occupied thereby providing a capability to determine whether a vehicle is parked in the parking space for which it is intended.

According to an aspect, the method further comprises, after the status of the selected parking space is changed from reserved to occupied, determining, using the positioning system, a location of the computing device relative to the occupied parking space thereby defining a relative location, and determining, using the relative location and time, whether the vehicle has left the occupied parking space.

According to an aspect, the method further comprises, after determining that the vehicle has left the occupied parking space, crediting a user account for the time remaining in the occupation period.

According to an aspect, the occupation signal further comprises identification of a user account which is associated to the computing device and from which is debited payment for the occupation of the parking space.

According to an aspect, the method further comprises consulting the parking system database to confirm whether the selected parking space is sponsored and, if so, debiting payment for the occupation of the parking space from a sponsor account instead of from the user account.

According to an aspect, the method further comprises showing an advertisement on the user interface upon confirming that the selected parking space is sponsored.

According to an aspect, once a grace period passes after the initial reservation period or the revised reservation period, generating and transmitting, from the computing device, an availability signal to the parking system database, the availability signal comprising the ID of the selected reserved parking space and instructions for changing the status of the selected parking space from reserved to unoccupied in the parking system database.

According to an aspect, a set reservation period is smaller than, and finishes at the same time as, the initial reservation period or the revised reservation period, and further wherein the status of selected reserved parking space is set to unoccupied for occupation by another vehicle until the set reservation period starts.

According to an aspect, the reservation status comprises a reservation status for a future period.

According to an aspect, the requesting comprises: showing, on the display, a map taking into account the present location of the computing device; and selecting, on the user interface, an unreserved parking space from the unreserved parking spaces.

According to an aspect, the method further comprises providing, on the display, a remote location different from the present location and showing the map taking into account the remote location.

According to an aspect, the method further comprises selecting, on the user interface, a distance around the remote location to change a scale of the map thereby resulting in showing more or less unoccupied parking spaces.

According to an aspect, the positioning system computes a speed at which the computing device is moving; and if the computing device is moving above a given threshold speed, preventing the transmitting of the reservation signal.

According to an aspect, producing a signal indicative of a distance to an unoccupied parking space (to issue an alarm or other means of alerting a user).

According to an aspect, the method further comprises providing a position of the vehicle prior to the computing the estimated travel time whereby the position of the vehicle is used in the computing the estimated travel time.

According to an aspect, the computing the estimated travel time comprises computing the estimated travel time from the present location of the computing device to the selected unreserved parking space while using the vehicle.

According to another embodiment, there is described a method for reserving a parking space for a vehicle using a computing device having a display, a user interface and a positioning system. The method comprising: showing, on the display, a map taking into account a present location of the computing device; the computing device accessing a parking system database to obtain: a status of parking spaces on the map indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location (coordinates) of each of the unoccupied parking spaces on the map; selecting, on the user interface, an unreserved parking space from the unreserved parking spaces; using the positioning system, computing an estimated travel time, including a travel leg using the vehicle, to the selected unreserved parking space; based on the estimated travel time, proposing, on the display, an initial reservation period for the selected unreserved parking space; accepting, on the user interface, the proposed initial reservation period; and upon the accepting, generating and transmitting, from the computing device, a reservation signal to the parking system database, the reservation signal comprising the ID of, and the initial reservation period for, the selected unreserved parking space and instructions for changing the status of the selected parking space from unreserved to reserved in the parking system database.

According to another embodiment, there is described a non-transitory machine readable medium encoded with instructions that cause a web-enabled computing device to perform a method comprising the acts of: obtain a request, while the web-enabled computing device is at a present location, for an unreserved parking space from a plurality of unreserved parking spaces in a parking system database thereby defining a selected unreserved parking space, the unreserved parking spaces being in a location which is different from the present location; computing an estimated travel time from the present location of the web-enabled computing device to the selected unreserved parking space; based on the estimated travel time, automatically calculating an initial reservation period for the selected unreserved parking space; and upon receiving an acceptance of the initial reservation period, generating and transmitting a reservation signal, the reservation signal comprising an ID of, and the initial reservation period for, the selected unreserved parking space and instructions for changing a status of the selected parking space from unreserved to reserved.

According to another embodiment, there is described a method for reserving a parking space for a vehicle using a computing device having a display, a user interface and a positioning system. The method comprises: requesting, on the user interface and while the computing device is at a present location obtained by the positioning system, an unreserved parking space from a plurality of unreserved parking spaces in a parking system database thereby defining a selected unreserved parking space, the unreserved parking spaces being in a location which is different from the present location; computing an estimated travel time from the present location of the computing device to the selected unreserved parking space; based on the estimated travel time, automatically calculating, and proposing on the user interface, an initial reservation period for the selected unreserved parking space; accepting, on the user interface, the initial reservation period; upon the accepting, generating and transmitting, from the computing device, a reservation signal to the parking system database, the reservation signal comprising an ID of, and the initial reservation period for, the selected unreserved parking space and instructions for changing a status of the selected unreserved parking space from unreserved to reserved in the parking system database; and proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent.

According to an aspect, the method further comprises comparing a location of the computing device, using the positioning system, to the location of the selected reserved parking space and determining, from the comparing, whether the vehicle occupies the reserved parking space to change the status of the selected reserved parking space from reserved to occupied.

According to an aspect, the step of determining whether the vehicle occupies the reserved parking space is performed without the use of fixed sensors for each parking space.

According to an aspect, the method further comprises: during the initial reservation period, generating and transmitting, from the computing device, an occupation signal to the parking system database, the occupation signal comprising the ID of the selected reserved parking space and instructions for changing the status of the selected reserved parking space from reserved to occupied for an occupation period in the parking system database; and after the status of the selected parking space is changed from reserved to occupied, determining, using the positioning system, a location of the computing device relative to the occupied parking space thereby defining a relative location, and determining, using the relative location and time, whether the vehicle has left the occupied parking space.

According to an embodiment, there is described a method for reserving a parking space for a vehicle using a computing device having a display, a user interface and a positioning system. The method comprises: requesting, on the user interface, an unreserved parking space from a plurality of unreserved parking spaces in a parking system database thereby defining a selected unreserved parking space; computing an estimated travel time from a starting location to the selected unreserved parking space, the starting location being at a distance from the selected unreserved parking space; based on the estimated travel time, automatically calculating, and proposing on the user interface, an initial reservation period for the selected unreserved parking space; accepting, on the user interface, the initial reservation period; upon the accepting, generating and transmitting, from the computing device, a reservation signal to the parking system database, the reservation signal comprising an ID of, and the initial reservation period for, the selected unreserved parking space and instructions for changing a status of the selected unreserved parking space from unreserved to reserved in the parking system database; and proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent.

According to an embodiment, there is described a method for reserving a parking space for a vehicle using a web-enabled computing device having a display, a user interface and a positioning system. The method comprises: showing, on the display, a map taking into account a present location of the web-enabled computing device obtained from the positioning system; the web-enabled computing device accessing a parking system database to obtain: a status of parking spaces on the map indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location of each of the unoccupied parking spaces on the map; selecting, on the user interface, an unreserved parking space from the unreserved parking spaces thereby defining a selected unreserved parking space; computing an estimated travel time from a starting location of the web-enabled computing device to the selected unreserved parking space; based on the estimated travel time, automatically calculating, and displaying on the display, an initial reservation period for the selected unreserved parking space; accepting, on the user interface, the initial reservation period; upon the accepting, generating and transmitting, from the web-enabled computing device, a reservation signal to the parking system database, the reservation signal comprising the ID of, and the initial reservation period for, the selected unreserved parking space and instructions for changing the status of the selected unreserved parking space from unreserved to reserved in the parking system database; and proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent.

According to an embodiment, there is described a non-transitory machine readable medium encoded with instructions that cause a web-enabled computing device having a user interface to perform a method for reserving a parking space for a vehicle comprising the acts of: receiving a request, on the user interface, an unreserved parking space from a plurality of unreserved parking spaces in a parking system database thereby defining a selected unreserved parking space; computing an estimated travel time from a starting location to the selected unreserved parking space, the starting location being at a distance from the selected unreserved parking space; based on the estimated travel time, automatically calculating an initial reservation period for the selected unreserved parking space; upon receiving an acceptance of the initial reservation period, generating and transmitting a reservation signal, the reservation signal comprising an ID of, and the initial reservation period for, the selected unreserved parking space and instructions for changing a status of the selected unreserved parking space from unreserved to reserved in the parking system database; proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent.

It is understood that all possible combinations of the embodiments and aspects described above are included in the present description.

BRIEF DESCRIPTION OF THE DRAWINGS

Further features and advantages of the present disclosure will become apparent from the following detailed description, taken in combination with the appended drawings, in which:

FIG. 8 is a flowchart illustrating a process for reserving a parking space in accordance with an embodiment;

FIG. 9 is a flowchart illustrating a process for revising a reservation period for a parking space in accordance with an embodiment;

FIG. 14 is a diagram showing a timeline and status for a parking space according to an exemplary embodiment of the methods described herein.

It will be noted that throughout the appended drawings, like features are identified by like reference numerals.

DETAILED DESCRIPTION

Figure 1:
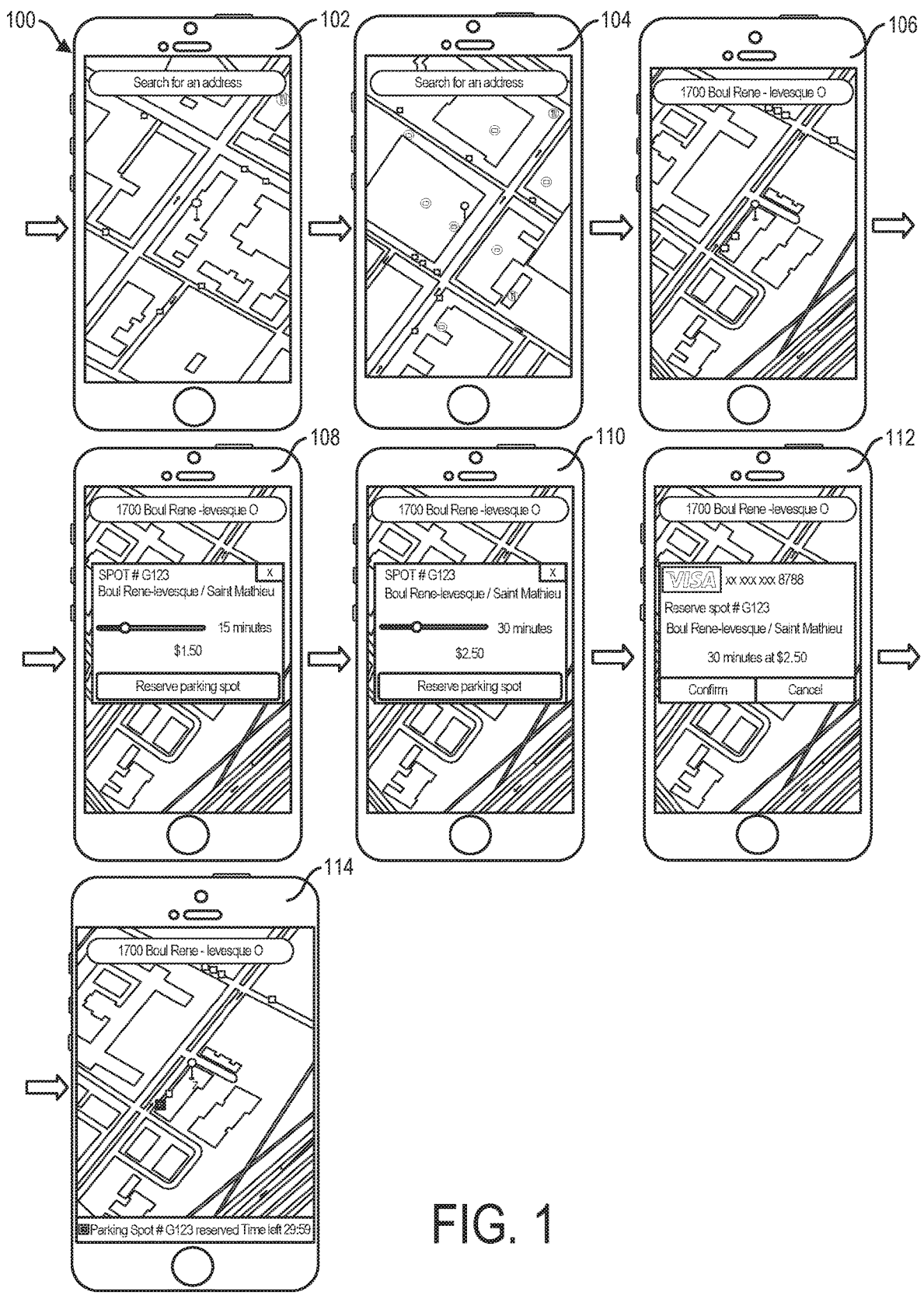
FIG. 1 is a series of screen shots illustrating a method for reserving a parking space for a vehicle in accordance with an embodiment.

Turning to FIG. 1, there is shown a series of screen shots 100 illustrating a method for reserving a parking space for a vehicle in accordance with an embodiment.

To initiate the method, a user accesses a mobile application (aka "application") on the mobile computing device (screen shot 102). The application will mark a pin on the map at the present location of the mobile computing device. The present location is determined by the positioning system of the mobile computing device. The mobile application shows the unreserved parking spaces with dots on the map within a given distance from the pin on the map. A default zoom range is specified in the user's preferences in the mobile application.

A user optionally moves the pin around on the map to a new desired location. The application will automatically update the unoccupied parking spaces around the new location of the pin on the map (screen shot 104).

From screen shot 102 or screen shot 104, a user optionally enters the desired address in the text box. The application will move the pin on the map to the address entered in the text box and automatically update the unoccupied parking spaces around the new location of the pin on the map (screen shot 106).

From screen shot 106, a user selects one of the unreserved parking spaces. The application then displays the reservation details of the selected unreserved parking space (screen shot 108). The reservation details include: the parking space ID (i.e., identifier which can be an alphanumeric code), the parking space location (e.g., coordinates, address, street name with closest crossing street, etc.), an initial reservation period, a total reservation fee to pay, etc.

From screen shot 108, the user optionally uses a time slider to change the initial reservation period to a revised reservation period. The application will update the reservation fee to pay according to the revised reservation period to an updated reservation fee and display the updated reservation fee (screen shot 110).

From screen shot 110, the user completes the reservation of the selected unreserved parking space. He does so by pressing the "reserve" icon on the user interface. The application will display a confirmation window with the following details: payment method to use (e.g., credit card, debit card, PayPal®, other payment account information, etc.), ID of the selected unreserved parking space, the reservation period (initial or revised), total reservation fee to pay, etc. (screen shot 112).

From screen shot 112, the user accepts the reservation details by pressing the "confirm" icon on the user interface. The application will reserve the parking space for the user and will display a reservation bar showing the reserved parking space ID and the time remaining for the reservation (screen shot 114).

Figure 2:
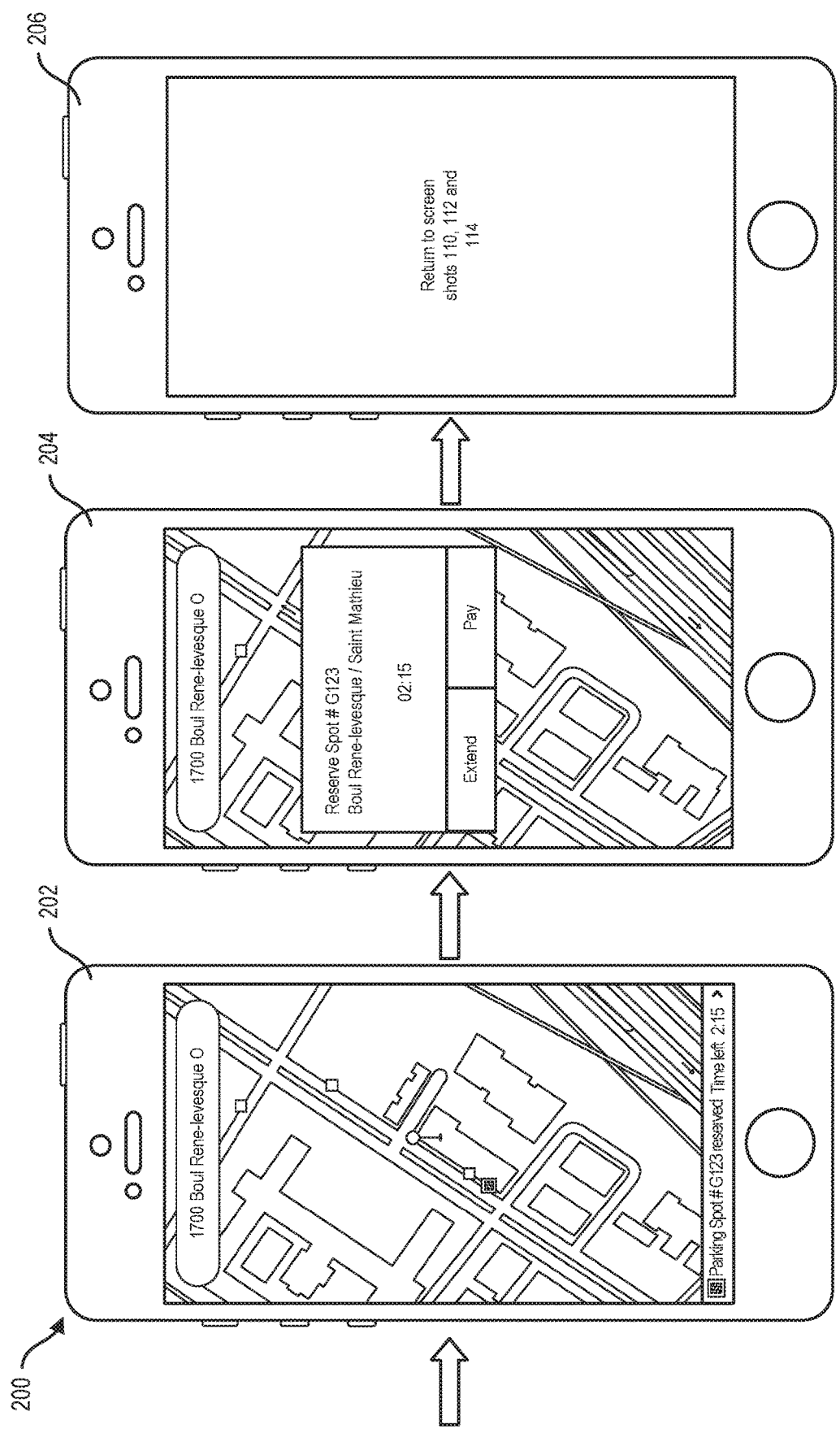
FIG. 2 is a series of screen shots illustrating a method for revising a reservation period for a parking space in accordance with an embodiment.

Now turning to FIG. 2, there is shown a series of screen shots 200 illustrating a method for revising a reservation period for a parking space in accordance with an embodiment.

The user accesses the application. The application display a reservation bar showing the reserved parking space ID and the time remaining for the reservation (screen shot 202).

From screen shot 202, the user presses the reservation bar icon. The application will display a window with the reserved parking space ID, its location and the time remaining for the reservation (screen shot 204). The window also includes an "Extend" button for extending (e.g., revising) the reservation period and a "Pay" button to pay for the selected reserved parking space once the vehicle is parked therein.

From screen shot 204, the user presses the "Extend" button. The application returns to screen shots 110, 112 and 114 to perform the associated steps.

Figure 3:
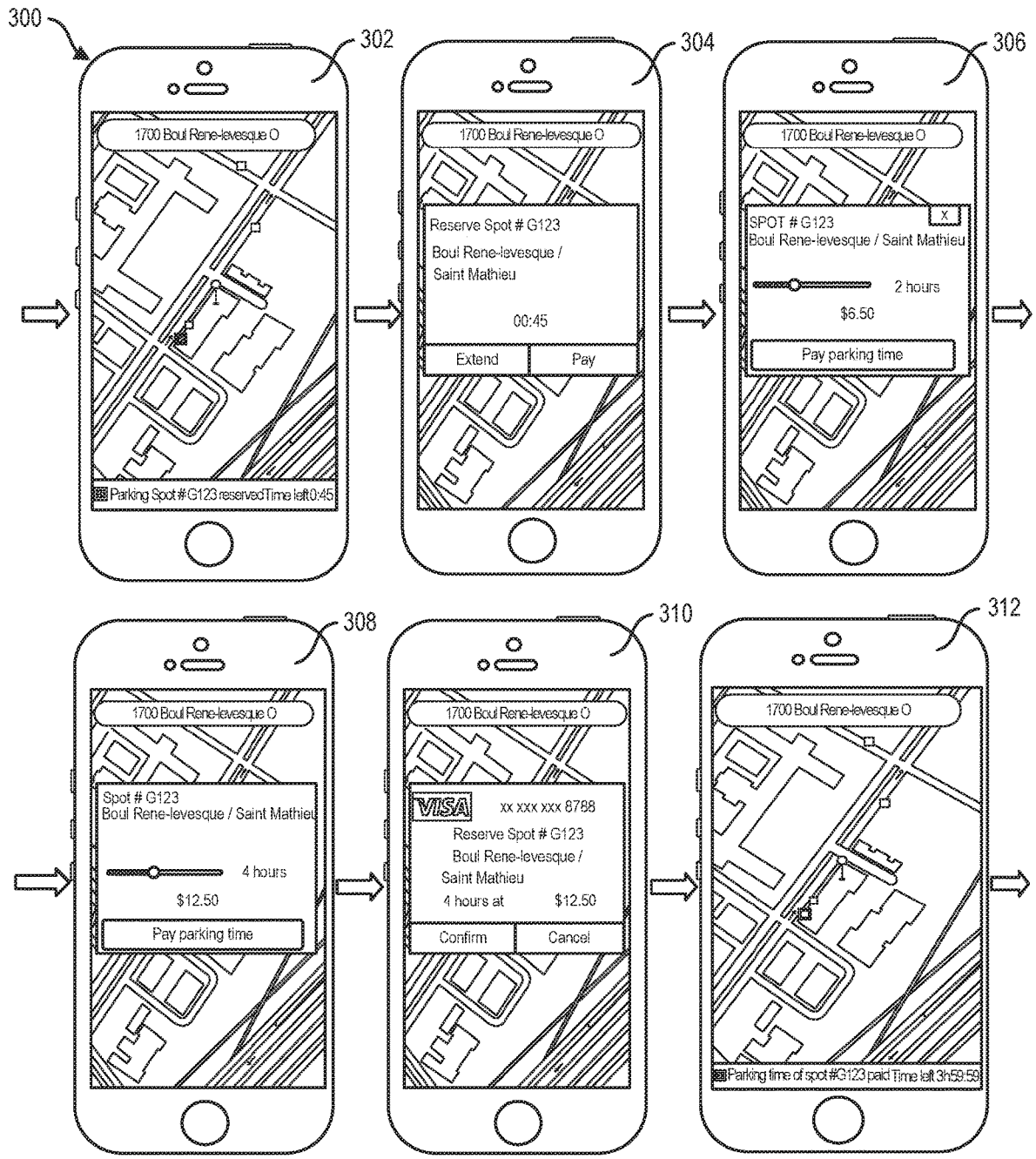
FIG. 3 is a series of screen shots illustrating a method for payment of a reserved parking space for a vehicle in accordance with an embodiment.

Now turning to FIG. 3, there is shown a series of screen shots 300 illustrating a method for payment of a reserved parking space for a vehicle in accordance with an embodiment.

The user accesses the application. The application display a reservation bar showing the reserved parking space ID and the time remaining for the reservation (screen shot 302).

From screen shot 302, the user presses the reservation bar icon. The application will display a window with the reserved parking space ID, its location and the time remaining for the reservation (screen shot 304). The window also includes an "Extend" button for extending (e.g., revising) the reservation period and a "Pay" button to pay for the selected reserved parking space once the vehicle is parked therein.

From screen shot 304, the user presses the "Pay" button to pay for the selected reserved parking space once the vehicle is parked therein thereby changing the status of the selected parking space from reserved to occupied. The application displays the details of the occupied parking space which include: the parking space ID, its location, a proposed occupation period, the total amount to pay, etc. (screen shot 306). The application also shows a time slider to change the initial occupation period and a "Pay parking time" icon.

From screen shot 306, the user can optionally change the initial occupation period (thereby defining a revised occupation period). The application will update the total amount to pay according to the revised occupation period (screen shot 308).

From screen shot 308, the user presses the "Pay parking time" icon. The application displays a confirmation window with the following information: the parking space ID, its location, an initial occupation period, the total amount to pay, etc. (screen shot 310). The application also shows a "Confirm" icon and a "Cancel" icon.

From screen shot 310, the user presses the "Confirm" icon. The application will confirm the transaction (i.e., make the payment) for the selected and occupied parking space and will display an occupation bar showing the parking space ID and the remaining occupation time (screen shot 312).

Figure 4:
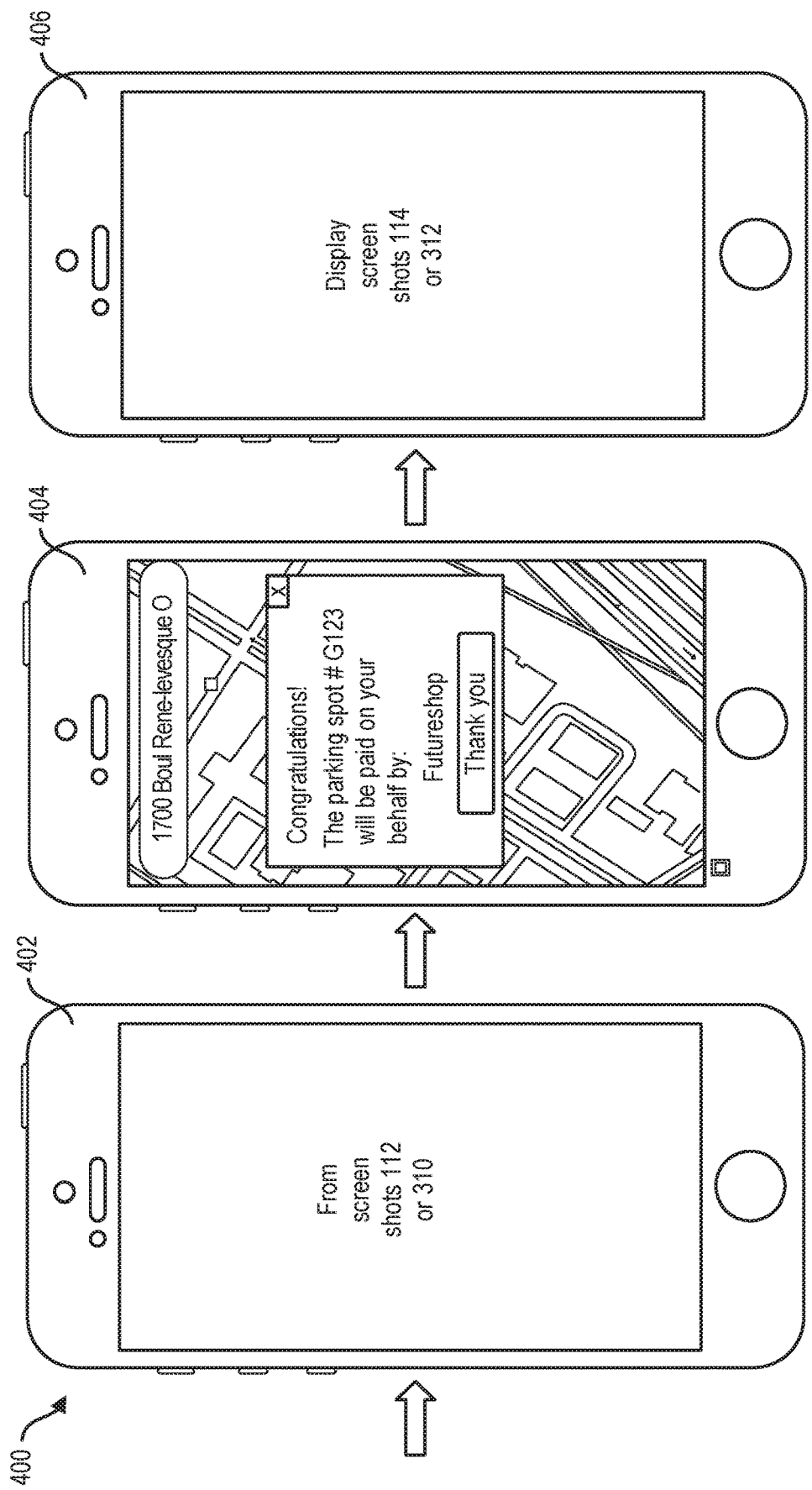
FIG. 4 is a series of screen shots illustrating a method for payment, by an ad sponsor, of a reserved parking space for a vehicle in accordance with an embodiment.

Now turning to FIG. 4, there is shown a series of screen shots 400 illustrating a method for payment, by an ad sponsor, of a reserved parking space for a vehicle in accordance with an embodiment.

This part of the method start at the payment confirmation window shown in either one of screen shot 112 or 310 (screen shot 402). From screen shot 402, the user presses the "Confirm" icon. The application will display a window informing the user that the reservation of occupation time (aka parking time) will be paid by an ad sponsor (screen shot 404). The user then simply presses the "Thank You" icon and, at screen shot 406, the application will display reservation bar or the occupation bar (screen shot 114 or screen shot 312).

Figure 5:
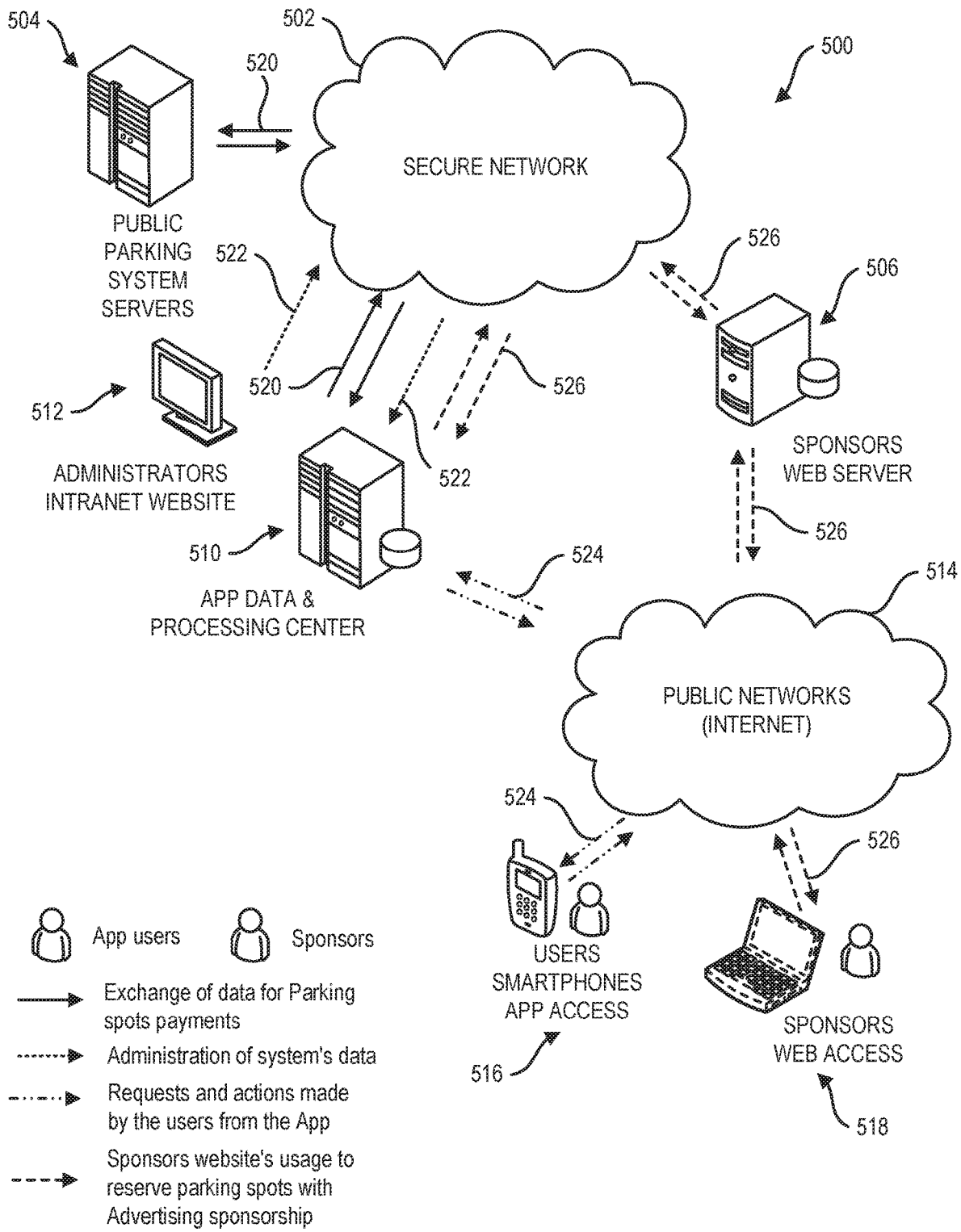
FIG. 5 is a diagram showing an architecture and the flow of data in a system for reserving a parking space for a vehicle in accordance with an embodiment.

Now turning to FIG. 5, there is shown a diagram showing an architecture and the flow of data in a system 500 for reserving a parking space for a vehicle in accordance with an embodiment.

The system 500 comprises a secure network 502 which provides secure communications between:
the parking system server 504 and an associated parking system database (not shown);
the administrator intranet website server 512;
the application data and processing server 510; and
the sponsor web server 506.

The administrator intranet website server 512 and the sponsor web server 506 in turn communicate, thru public networks 514 (such as the internet and telecom networks), with the users' mobile computing devices 516 (aka smart phones) and the sponsors' web access device 518 (e.g., web-enabled computing devices).

According to an embodiment, the information which is exchanged within system 500 comprises:
parking space payment data 520;
system administration data 522;
sponsors website usage to reserve parking spaces with advertising sponsorship 526; and
requests and actions made by the user from the application 524.

The application data and processing server 510 comprises: a database (not shown) for storing user information, reservation information and transaction information; a memory (not shown) for storing data and instructions; and a processor (not shown) in communication with the memory. The processor is for executing instructions related to the method described herein which are applicable to application data and processing center 510 which in fact acts as an interface between the mobile computing device 516 and the parking system server 504.

The mobile computing device 516 comprises: a memory (not shown) for storing data and instructions; and a processor (not shown) in communication with the memory. The processor is for executing instructions related to the method described herein which are applicable to the application. The mobile computing device 516 hosts the mobile application described herein.

It should be understood that even though the method is described herein as being embodied as an application on a mobile computing device 516, it could also be operated as a web site on any web-enabled computing device (including one which is not mobile).

Figure 6:
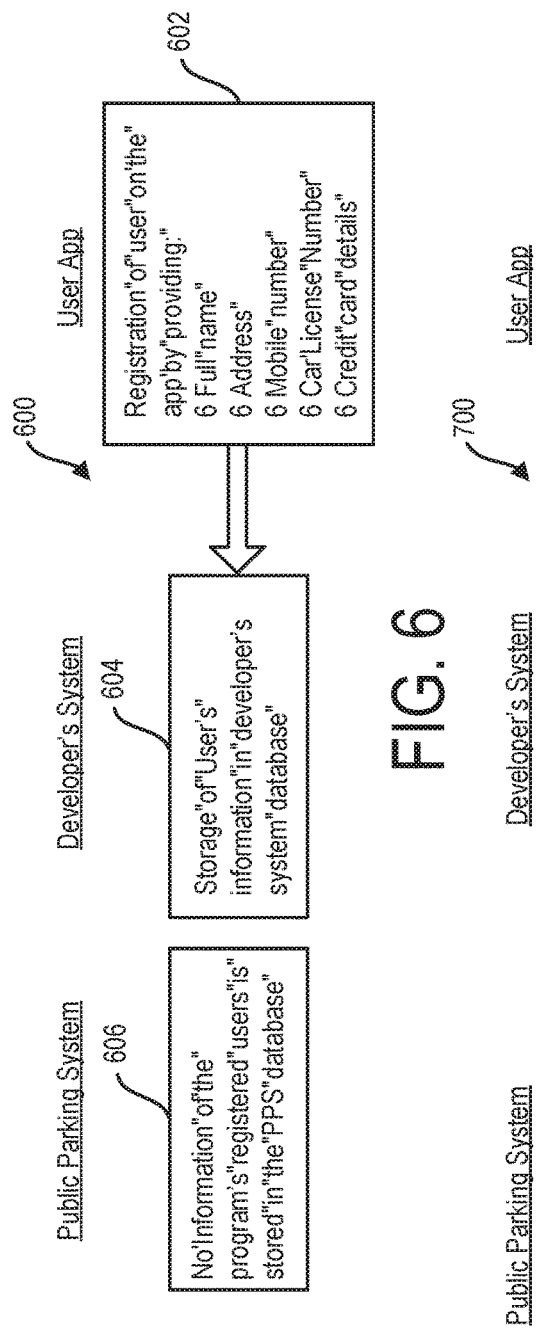
FIG. 6 is a flowchart illustrating a process for registering a user/computing device in the system in accordance with an embodiment.

Now turning to FIG. 6, there is shown a flowchart illustrating a process 600 for registering a user/mobile computing device in the system in accordance with an embodiment.

On the application, the registration of a user is performed by providing: a user's full name, a user's home address and/or email address, a phone number (mobile, landline or other) and/or other contact details, the vehicle's license plate number (or other form of ID for the vehicle) and payment details (credit card, debit card, PayPal® or other form of recognized payment) (step 602).

The supplied registration information is then sent to the application data and processing server 510 where it is stored in the associated system database (step 604). At this point, no information concerning the user is stored in the parking system database (step 606).

Figure 7:
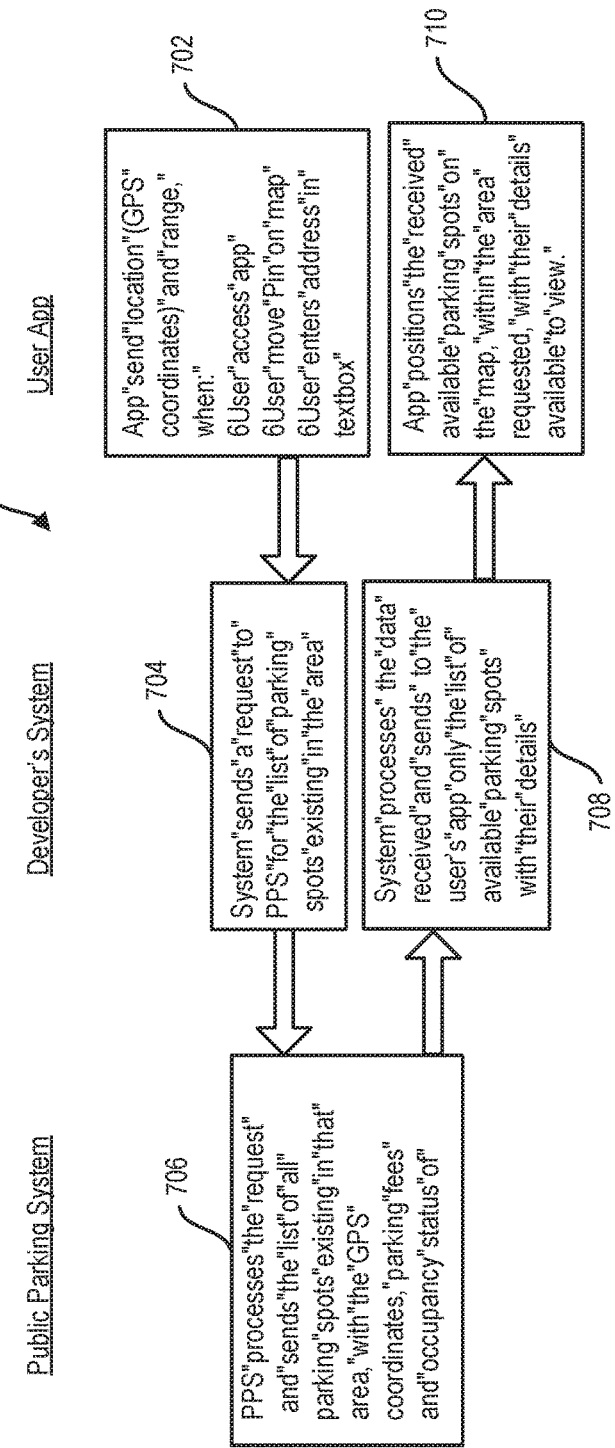
FIG. 7 is a flowchart illustrating a process for looking up on a map the unreserved parking spaces in accordance with an embodiment.

Now turning to FIG. 7, there is shown a flowchart illustrating a process 700 for looking up on a map the unreserved parking spaces in accordance with an embodiment.

At step 702, the application sends location information (GPS coordinates) for the mobile computing device 516 to the application data and processing server 510 when:
- the user accesses the application;
- the user moves the pin on the map; or
- the user enters an address in the textbox on the user interface.

At step 704, the application data and processing server 510 sends a request to the parking system server 504 to obtain a list of all the parking spaces and their coordinates according to the map being displayed on the mobile computing device 516.

At step 706, the parking system server 504, processes the request and sends the list of all the parking spaces and their coordinates according to the map being displayed on the mobile computing device 516 as well as the fees for occupying the parking spaces and the status of occupancy of all the parking spaces.

At step 708, the application data and processing server 510 processes the data received from the parking system server 504 and sends to the mobile computing device 516 only the list of unreserved parking spaces with their details.

At step 710, the application positions the received list of unreserved parking spaces on the map being displayed with their details available for view; e.g., by "clicking" on the icon (dot) for the unreserved parking spaces.

Now turning to FIG. 8, there is shown a flowchart illustrating a process 800 for reserving a parking space in accordance with an embodiment.

At step 802, the user views, on the display of the mobile computing device 516, the details of a selected parking space and chooses a reservation period (initial or revised) and confirms/accepts the reservation.

At step 804, the application data and processing server 510 processes and sends the reservation request to the parking system server 504.

At step 806, the parking system server 504 processes the request, stores the transaction details (license number, parking space ID, reservation period, etc.), update the status of the selected parking space from unreserved to reserved and sends a confirmation signal/message to the application data and processing server 510.

At step 808, the application data and processing server 510 stores the reservation and payment details and sends a confirmation to the mobile computing device 516.

At step 810, the application displays the reservation and payment confirmation and updates the map with the reservation bar at the bottom of the display.

Now turning to FIG. 9, there is shown a flowchart illustrating a process 900 for revising a reservation period for a parking space in accordance with an embodiment.

At step 902, the application sends a revised reservation period request to the application data and processing server 510 when the user selects a revised reservation period and confirms his request.

At step 904, the application data and processing server 510 processes the request and sends the reservation request to the parking system server 504.

At step 906, the parking system server 504 processes the request, stores the transaction details (license number, parking space ID, reservation period, etc.), and sends a confirmation signal/message to the application data and processing server 510.

At step 908, the application data and processing server 510 stores the reservation and payment details and sends a confirmation to the mobile computing device 516.

At step 910, the application displays the reservation and payment confirmation and updates the map with the reservation bar at the bottom of the display.

Figure 10:
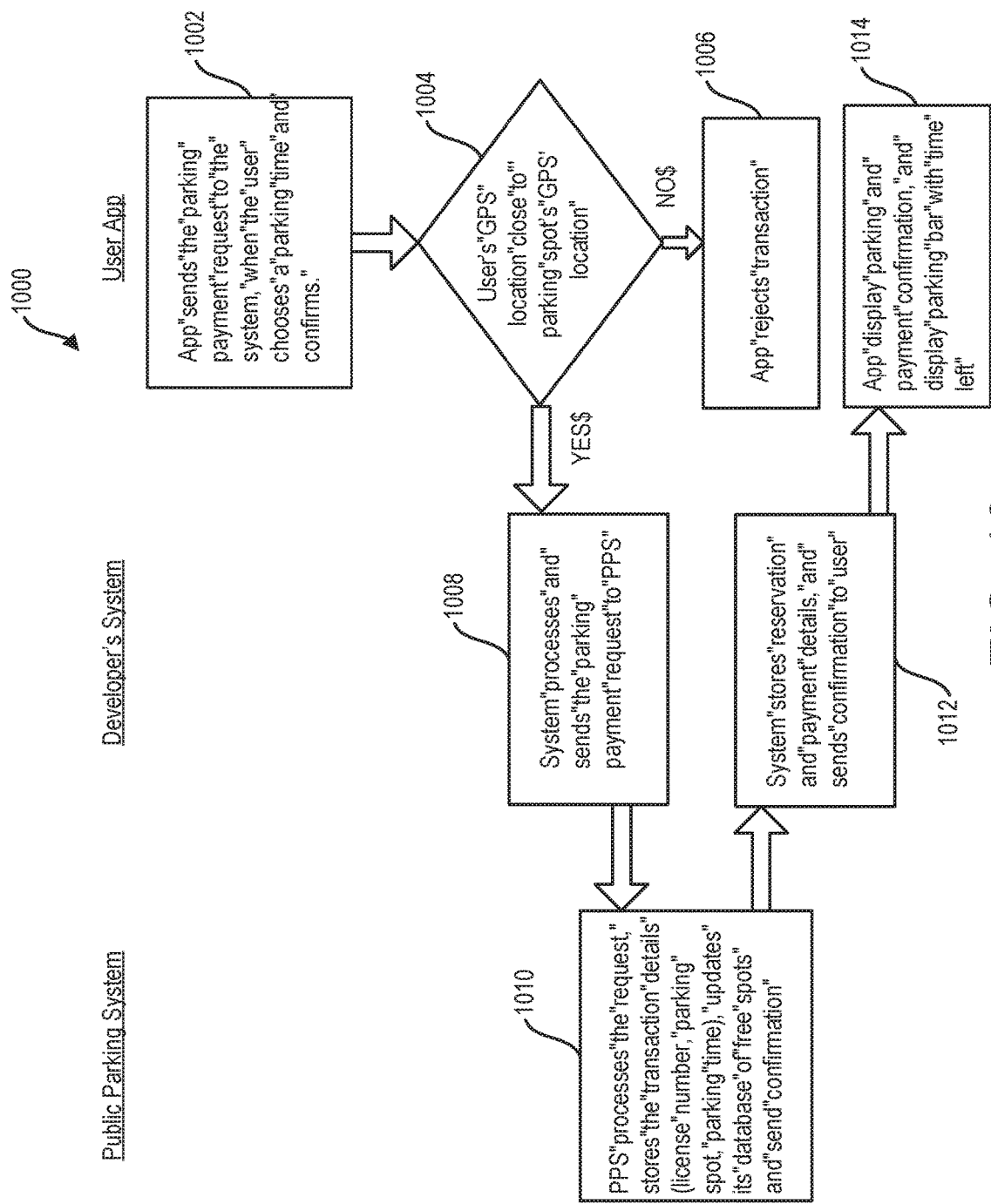
FIG. 10 is a flowchart illustrating a process for payment of a reserved parking space for a vehicle in accordance with an embodiment.

Now turning to FIG. 10, there is shown a flowchart illustrating a process 1000 for payment of a reserved parking space for a vehicle in accordance with an embodiment.

At step 1002, the application sends the parking payment request to the application data and processing server 510 when the user selects a parking occupation period and confirms his payment request.

At step 1004, the mobile computing device 516 uses its GPS to determine if the mobile computing device 516 is within a given range of the parking space. If it is not, the application rejects the transaction (step 1006). If it is, the method proceeds to step 1008.

At step 1008, the application data and processing server 510 processes the request and sends the parking occupation period request to the parking system server 504.

At step 1010, the parking system server 504 processes the request, stores the transaction details (license number, parking space ID, occupation period, etc.), updates the status of the selected parking space from reserved to occupied and sends a confirmation signal/message to the application data and processing server 510.

At step 1012, the application data and processing server 510 stores the occupation and payment/transaction details and sends a confirmation to the mobile computing device 516.

At step 1014, the application displays the occupation and payment confirmation and updates the map with the occupation bar at the bottom of the display.

Figure 11:
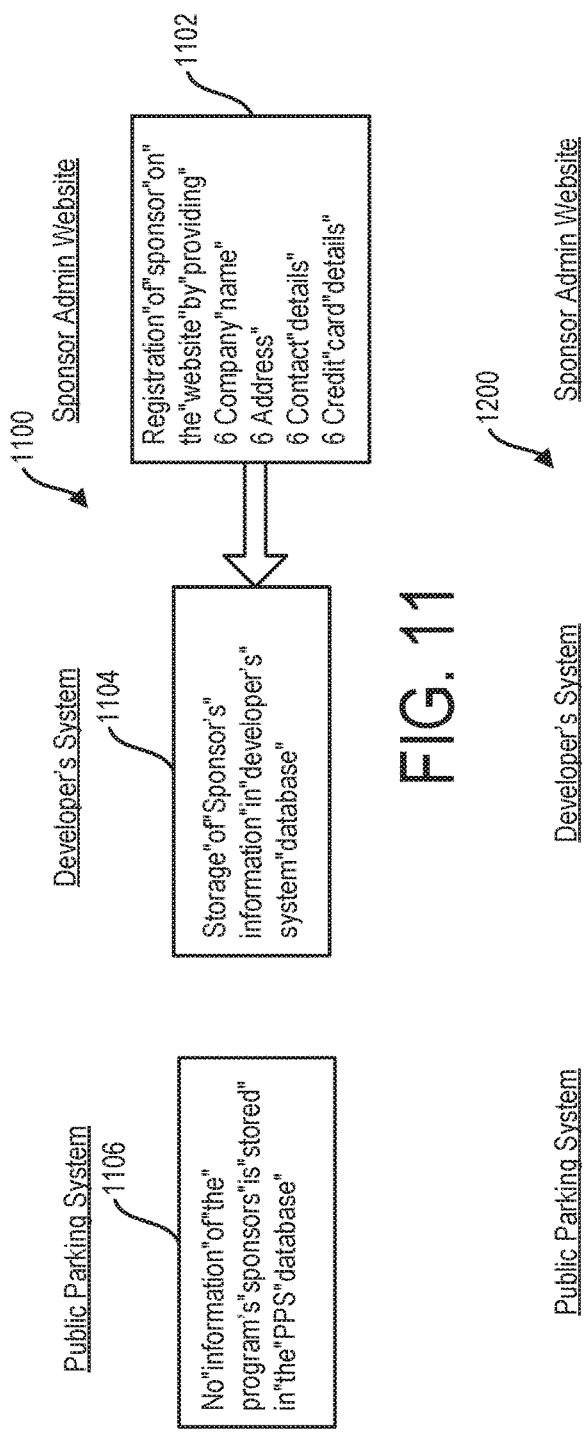
FIG. 11 is a flowchart illustrating a process for registering a sponsor in the system in accordance with an embodiment.

Now turning to FIG. 11, there is shown a flowchart illustrating a process 1100 for registering a sponsor in the system in accordance with an embodiment.

On the sponsor's website, the registration of a sponsor is performed by providing: a sponsor's name, a sponsor's address and/or email address, a sponsor's contact details, and payment details (credit card, debit card, PayPal® or other form of recognized payment) (step 1102).

The supplied registration information is then sent to the application data and processing server 510 where it is stored in the associated system database (step 1104). At this point, no information concerning the sponsor is stored in the parking system database (step 1106).

Figure 12:
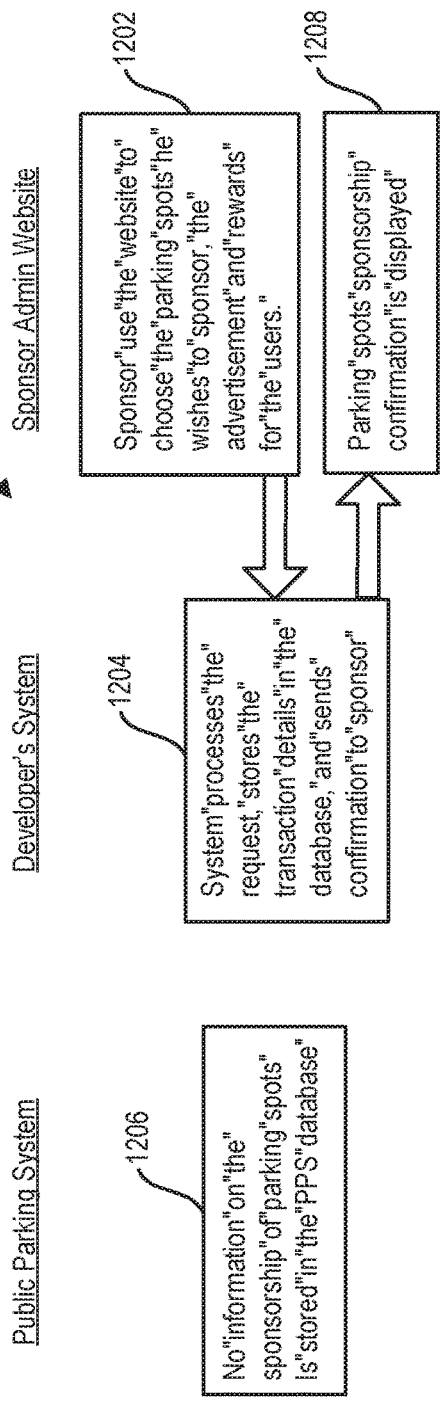
FIG. 12 is a flowchart illustrating a process for sponsoring, by a sponsor, selected parking spaces in accordance with an embodiment.

Now turning to FIG. 12, there is shown a flowchart illustrating a process 1200 for sponsoring, by a sponsor, selected parking spaces in accordance with an embodiment.

At step 1202, the sponsor uses the sponsor's website to choose the parking spaces they wish to sponsor, the advertisement to be shown and any rewards (discounts on purchases, etc.) for the users.

At step 1204, application data and processing server 510 processes the request, stores the transaction details in the database, and sends a confirmation to the sponsor's website. At this point, no information concerning the sponsor is stored in the parking system database (step 1206).

At step 1208, the parking space sponsorship is displayed on the sponsor's website.

Figure 13:
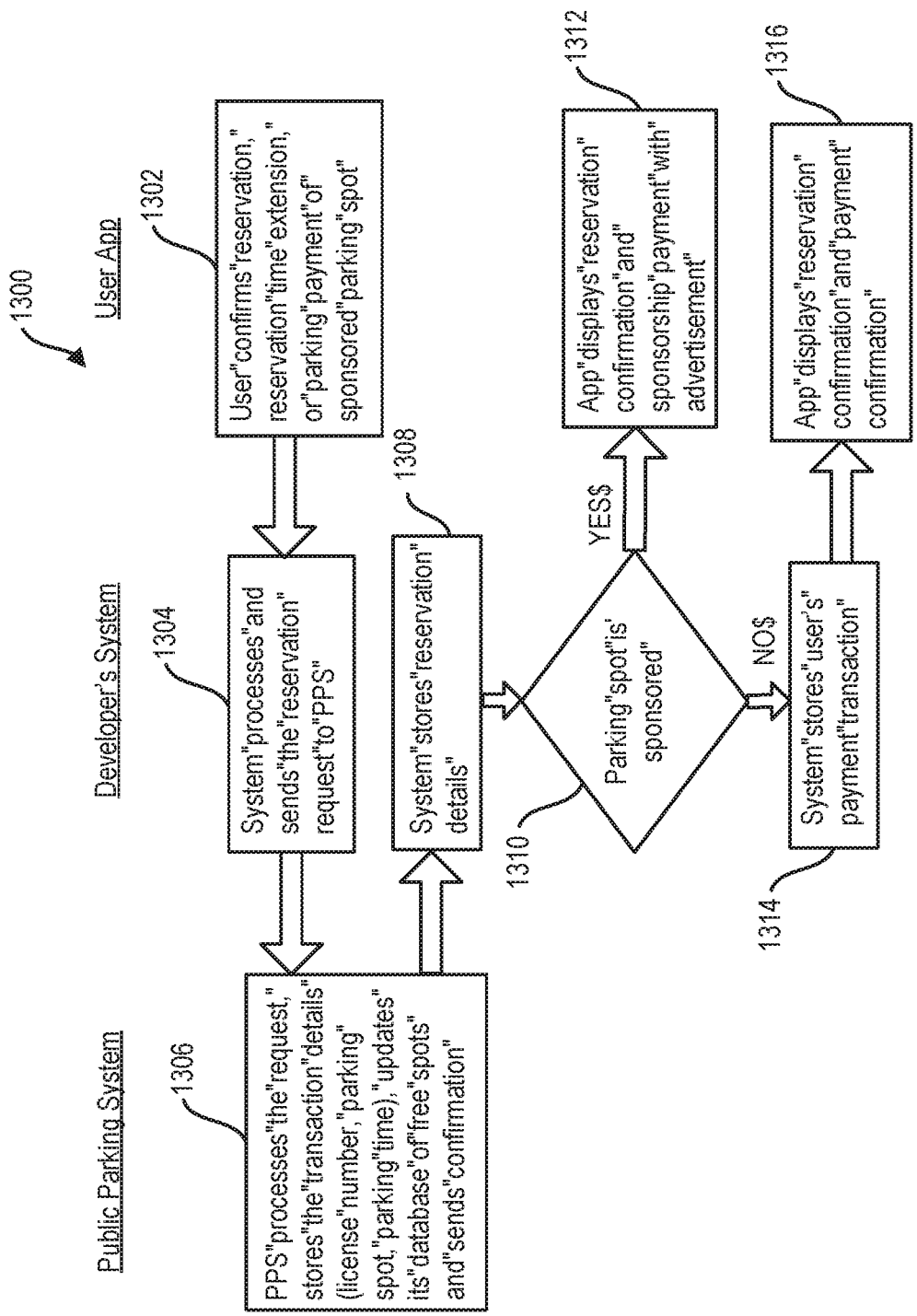
FIG. 13 is a flowchart illustrating a process for payment of selected parking spaces by a sponsor in accordance with an embodiment.

Now turning to FIG. 13, there is shown a flowchart illustrating a process 1300 for payment of selected parking spaces by a sponsor in accordance with an embodiment.

At step 1302, the application sends the parking payment request to the application data and processing server 510 when the user selects confirms a reservation period (initial or revised) or a parking occupation period and confirms his payment request.

At step 1304, the application data and processing server 510 processes the payment request and sends the reservation request to the parking system server 504.

At step 1306, the parking system server 504 processes the request, stores the transaction details (license number, parking space ID, occupation period, etc.), updates the status of the selected parking space from reserved to occupied and sends a confirmation signal/message to the application data and processing server 510.

At step 1308, the application data and processing server 510 stores the occupation details.

At step 1310, the application data and processing server 510 confirms if the parking space is sponsored. If it is, the application data and processing server 510 sends a confirmation to the mobile computing device 516. The application displays the confirmation and the sponsorship payment with the advertisement (step 1312). The application then displays the reservation or occupation and updates the map with the reservation bar or occupation bar at the bottom of the display.

If the parking space is not sponsored, the application data and processing server 510 stores payment/transaction details and sends a confirmation to the mobile computing device 516 (step 1314).

At step 1316, the application displays the reservation or occupation confirmation and payment/transaction confirmation. The application then updates the map with the reservation bar or occupation bar at the bottom of the display.

OTHER EMBODIMENTS AND EXAMPLES

According to another embodiment, there is described a method for reserving a parking space for a vehicle using a web-enabled computing device (mobile computing device 516 being one type of web-enabled computing device; i.e., in some embodiments, the method would work even though the web-enabled computing device is not mobile) having a display, a user interface and positioning system. The method comprises: requesting, on the user interface and while the web-enabled computing device is at a present location, an unreserved parking space from a plurality of unreserved parking spaces thereby defining a selected unreserved parking space; computing an estimated travel time from the present location of the web-enabled computing device to the selected unreserved parking space; based on the estimated travel time, automatically calculating, and proposing on the user interface (here proposing on the user interface encompasses proposing by the user interface; e.g., in the case where the user interface is a voice activated interface), an initial reservation period for the selected unreserved parking space; accepting, on the user interface, the initial reservation period; and upon the accepting, generating and transmitting, from the web-enabled computing device, a reservation signal to a parking system database, the reservation signal comprising an ID of, and the initial reservation period for, the selected unreserved parking space and instructions for changing a status of the selected parking space from unreserved to reserved in the parking system database. Normally, the reservation signal would also include payment details and an identifier of the web-enabled computing device which is used to make the reservation in order, among other things, to match the web-enabled computing device to an account for the user of the web-enabled computing device.

Examples for the user interface include, but are not limited to, a touch screen, a voice recognition system, a keyboard, etc.

It should be understood that instructions for changing a status are any type of instructions from a transmitting machine (the mobile communication device) and according to the communication protocol for the communication network being used which will make the change of status appear in the machine receiving the instructions (e.g., the parking system database).

While the proposing an initial reservation period is performed on the user interface of the web-enabled computing device, the automatically calculating an initial reservation period is not necessarily performed by the web-enabled computing device. The automatically calculating an initial reservation period may be performed by the web-enabled computing device or in another computing device with which the web-enabled computing device is in communication such as the parking system servers 504 or the application data processing server 510. The automatically calculating an initial reservation period is not performed by the user or another person. It is performed by a computing device/entity.

According to an embodiment, the computing an estimated travel time from the present location of the web-enabled computing device to the selected unreserved parking space includes the travel time for the user holding the web-enabled computing device to the vehicle and the travel time of the vehicle in its present location to the selected unreserved parking space. The travel time for the user holding the web-enabled computing device to the vehicle could include walking, but also any other modes of transportation to get to the vehicle that will travel to the selected reserved parking space.

The computing an estimated travel time may be performed by the web-enabled computing device or in another computing device with which the web-enabled computing device is in communication such as the parking system servers 504 or the application data processing server 510. The computing an estimated travel time is not performed by the user or another person. It is performed by a computing device/entity. The computing an estimated travel time therefore involves computing steps that may include the use as inputs of the average travel time and speed for the vehicle that needs to be parked. According to an embodiment, traffic patterns and/or actual traffic information are taken into account in the computing the estimated travel time. The information in the parking database is continually updated. The parking system database therefore always provides real-time information relayed through the system.

According to another embodiment, the method further comprises accessing, using the web-enabled computing device, the parking system database to obtain: a status of parking spaces indicative of: an occupancy, thereby defining occupied parking spaces and unoccupied parking spaces; and from the unoccupied parking spaces, a reservation status, thereby defining reserved parking spaces and unreserved parking spaces; an ID (identifier) of unreserved parking spaces; a location (coordinates) of each of the unoccupied parking spaces. The parking system database may also include parking rules and/or regulations and traffic/circulation status of the road network.

According to another embodiment, the reservation period is greater than the estimated travel time by a set time margin. According to an example, an estimated travel time is 30 minutes. The initial reservation period should normally be 30 minutes or more. For safety reasons, for an estimated travel time of 30 minutes, the set margin could be 5 minutes and the initial reservation period would be 35 minutes. The set margin could also be calculated using a percentage of the estimated travel time.

According to another embodiment, the method further comprises providing, on the user interface, an option to select a revised reservation period which is different from the initial reservation period. According to an example, the revised reservation period could be longer, but it could also be shorter. It would be longer in a situation where the user knows that he is not yet ready to get to his vehicle, but will do so later (e.g., in a few minutes). It would be shorter, if the user knows that, during this period of the day, there is no traffic and the estimated travel time is probably too high.

According to another embodiment, a difference between the revised reservation period and the initial reservation period is not greater than a limit time margin thereby preventing reservation of a selected unreserved parking space beyond a given threshold period. If the administrator of the system, because of legal or other requirements, determines that the maximum time for which a user should be entitled to make a reservation for a selected unreserved parking space is one hour, then this would be an example of a limit time. Regardless of the limit time, the reserved parking space could be made unoccupied for a certain period during the time the parking space is reserved. More details on this are provided hereinbelow.

According to another embodiment, the method further comprises, during the initial reservation period or the revised reservation period, generating and transmitting, from the mobile computing device 516, an occupation signal to the parking system database, the occupation signal comprising the ID of the selected reserved parking space and instructions for changing the status of the selected parking space from reserved to occupied for an occupation period in the parking system database. Normally, the occupation signal would also include payment details.

According to another embodiment, the method further comprises registering an identity for each of a plurality of vehicles on the parking system database wherein the reservation signal comprises a vehicle identity which is matched to the ID of the selected parking space for which the status is occupied thereby providing a capability to determine whether a vehicle is parked in the parking space for which it is intended. Using this feature would simplify the work of parking ticket inspectors who give out parking tickets to contravener. The ID could include the license plate number of the vehicle. Comparing the information from the parking system database with the license plate number of the vehicle occupying a parking space makes it easy to determine if the vehicle is authorized to be there. The process could be further simplified by using a portable computing device equipped with a camera and a software application capable of recognizing license plate numbers. Alternatively, for vehicles equipped with a positioning system (e.g., a GPS), their location could be stored in the parking system database and the parking ticket inspectors could simply go to the problematic vehicle without having to enter or obtain the license plate number of the vehicle. Furthermore, if a vehicle is in a parking space when it should not be there (during the reservation or occupancy period paid by someone else), a message can be sent to the owner of the vehicle at fault and/or to the user who has reserved the parking space and/or to the authorities which can decide if they will send a towing to remove the vehicle. The system can then identify an alternate unoccupied parking space in the vicinity and let the user decide to accept or to reject the alternate unoccupied parking space.

According to an embodiment, each user is given a unique confirmation code. The confirmation code could be used/entered upon paying for occupying a parking space. This will allow users to still pay for the parking space even if the user's mobile computing device is unavailable (lost, forgotten at home, broken, dead batteries, etc.).

According to another embodiment, the method further comprises, after the status of the selected parking space is changed from reserved to occupied, determining, using the positioning system, a location of the mobile computing device 516 relative to the occupied parking space thereby defining a relative location, and determining, using the relative location and time, whether the vehicle has left the occupied parking space. For example, upon arriving at the reserved parking space, the user will pay to occupy the parking space. Afterwards, he would normally leave the area of the vehicle at a walking pace. The application data and processing center 510 will perform this calculation and make note of this in its database. When the user return to the car, it will be determined that the mobile computing device 516 and the parking space are in close proximity. If within a set time, it is calculated that the mobile processing is leaving the close proximity of the parking space at a speed which corresponds to the normal vehicle speed, the application data and processing center 510 will perform this calculation and make note of this in its database.

According to another embodiment, the method further comprises, after determining that the vehicle has left the occupied parking space, crediting a user account for the time remaining in the occupation period. This can be performed automatically or a confirm request may be sent to the user and selected by him. For example, a user having paid for 2 hours of parking and leaving after 40 minutes only will be credited 80 minutes to his account for use for parking at a later time.

According to another embodiment, the occupation signal further comprises identification of a user account which is associated to the mobile computing device and from which is debited payment for the occupation of the parking space.

According to another embodiment, the method further comprises, consulting the parking system database to confirm whether the selected parking space is sponsored and, if so, debiting payment for the occupation of the parking space from a sponsor account instead of from the user account.

According to another embodiment, once a grace period passes after the initial reservation period or the revised reservation period, generating and transmitting, from the mobile computing device 516, an availability signal to the parking system database, the availability signal comprising the ID of the selected reserved parking space and instructions for changing the status of the selected parking space from reserved to unoccupied in the parking system database. This covers the situation where a user having reserved a parking space does not show up with his vehicle after a grace period (which could be set to 5 minutes or any other amount of time set by the authorities), the status of the parking space returns to being unoccupied and can be reserved or occupied by another user.

According to another embodiment, a set reservation period is smaller than, and finishes at the same time as, the initial reservation period or the revised reservation period, and further wherein the status of the selected reserved parking space is set to unoccupied for occupation by another vehicle until the set reservation period starts. For example, if a user makes a reservation for a parking space for 2 hours, the authorities could determine that the parking space can be occupied by another vehicle until 15 minutes (the set reservation period) prior to the ending of the reservation period (initial or revised).

According to another embodiment, the reservation status comprises a reservation status for a future period. This covers the situation where the reservation can be made for the next day or any other time in the future. This is normally determined by the authorities responsible for the parking spaces. The future period could also be determined as being a number of hours; e.g., 6 hours.

According to another embodiment, the requesting comprises: showing, on the display, a map taking into account the present location of the mobile computing device 516; and selecting, on the user interface, an unreserved parking space from the unreserved parking spaces.

According to another embodiment, the method further comprises providing, on the display, a remote location different from the present location and showing the map taking into account the remote location.

According to another embodiment, the method further comprises selecting, on the user interface, a distance around the remote location to change a scale of the map thereby resulting in showing more or less unoccupied parking spaces.

According to another embodiment, the positioning system computes a speed at which the mobile computing device 516 is moving; and if the mobile computing device 516 is moving above a given threshold speed, preventing the transmitting of the reservation signal.

According to another embodiment, the method further comprises producing a signal indicative of a distance to an unoccupied parking space (to issue an alarm or other means of alerting a user). This could be applicable to any unoccupied parking space; i.e., the one which is reserved (to facilitate its location) or another parking space which is satisfactory for the user of the vehicle.

According to another embodiment, the method further comprises providing a position of the vehicle prior to the computing the estimated travel time whereby the position of the vehicle is used in the computing the estimated travel time.

According to another embodiment, the computing the estimated travel time comprises computing the estimated travel time from the present location of the mobile computing device 516 to the selected unreserved parking space while using the vehicle.

According to another embodiment, there is described a method for reserving a parking space for a vehicle using a mobile computing device 516 having a display and a user interface. The method comprising: showing, on the display, a map taking into account a present location of the mobile computing device 516; the mobile computing device 516 accessing a parking system database to obtain: a status of parking spaces on the map indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location (coordinates) of each of the unoccupied parking spaces on the map; selecting, on the user interface, an unreserved parking space from the unreserved parking spaces; computing an estimated travel time, including a travel leg using the vehicle, to the selected unreserved parking space; based on the estimated travel time, automatically calculating and displaying, an initial reservation period for the selected unreserved parking space; accepting, on the user interface, the initial reservation period; and upon the accepting, generating and transmitting, from the mobile computing device 516, a reservation signal to the parking system database, the reservation signal comprising the ID of, and the initial reservation period for, the selected unreserved parking space and instructions for changing the status of the selected parking space from unreserved to reserved in the parking system database.

According to another embodiment, there is described a non-transitory machine readable medium encoded with instructions that cause a web-enabled computing device to perform a method comprising the acts of: obtain a request, while the web-enabled computing device is at a present location, for an unreserved parking space from a plurality of unreserved parking spaces thereby defining a selected unreserved parking space; computing an estimated travel time from the present location of the web-enabled computing device to the selected unreserved parking space; based on the estimated travel time, automatically calculating an initial reservation period for the selected unreserved parking space; and upon receiving an acceptance of the initial reservation period, generating and transmitting a reservation signal, the reservation signal comprising an ID of, and the initial reservation period for, the selected unreserved parking space and instructions for changing a status of the selected parking space from unreserved to reserved.

Now turning to FIG. 14, an example of the implementation of the method will be described.

According to an embodiment, FIG. 14 shows a timeline and status for a parking space during the execution of an embodiment of a method for reserving a parking space for a vehicle using a computing device having a display, a user interface and a positioning system.

The method comprises requesting (step 1402), on the user interface (e.g., the corner of Fourth Ave. and Main St.), an unreserved (and unoccupied) parking space (1420) from a plurality of unreserved parking spaces in a parking system database thereby defining a selected unreserved parking space (1422) (e.g., parking space ID #P702 at the corner $20^{th}$ Ave. and Main St. in the same city). The parking system database comprises, for example, all the parking spaces management by a city or a private operator. All parking space are geo-located and uniquely identified.

The method further comprises computing (step 1404) an estimated travel time (e.g., 45 mins) from a starting location (e.g., the corner of Fourth Ave. and Main St.) to the selected unreserved parking space (e.g., parking space ID #P702 at the corner $20^{th}$ Ave. and Main St. in the same city).

The starting location being at a distance from the selected unreserved parking space (e.g., there is a 4 km distance from the corner of Fourth Ave. and Main St. to the corner $20^{th}$ Ave. and Main St.). Normally, it would be a distance that is further than the user cares to walk.

The method further comprises based on the estimated travel time (e.g., 45 mins), automatically calculating (step 1406), and proposing on the user interface, an initial reservation period (1430) (e.g., 60 mins which is 45 mins of travel time plus 10 mins of walking time for the user to get to the vehicle and a 5 minute buffer period) for the selected unreserved parking space; accepting, on the user interface, the initial reservation period (e.g., 60 mins).

The method further comprises upon the accepting, generating and transmitting (step 1408), from the computing device, a reservation signal to the parking system database, the reservation signal comprising an ID of, and the initial reservation period (e.g., 60 mins) for, the selected unreserved parking space (e.g., P702) and instructions for changing a status of the selected unreserved parking space from unreserved to reserved (1424) in the parking system database.

The method further comprises proposing (not shown) on the user interface an initial occupation period (1432) (e.g., 90 mins), wherein the initial occupation period (e.g., 90 mins) is the period which is proposed for occupation of the parking space by the vehicle and further wherein the initial reservation period (e.g., 60 mins) ends when the initial occupation period (e.g., 90 mins) begins whereby the initial reservation period and the initial occupation period are not concurrent. In this example, the parking space will therefore be reserved for 60 mins (the user pays for this reservation) until it is occupied for 90 mins by the vehicle.

According to another embodiment, the method further comprises comparing (not shown) a location of the computing device to the location of the unreserved parking space and determining, from the comparing, whether the vehicle occupies the reserved parking space.

According to another embodiment, the step of determining (not shown) whether the vehicle occupies the reserved parking space is performed without the use of fixed sensors for each parking space.

According to another embodiment, the method further comprises (step 1410): during the initial reservation period, generating and transmitting, from the computing device, an occupation signal to the parking system database, the occupation signal comprising the ID of the selected reserved parking space and instructions for changing the status of the selected reserved parking space from reserved to occupied (1426) for an occupation period in the parking system database; and (step 1412) after the status of the selected parking space is changed from reserved to occupied, determining, using the positioning system, a location of the computing device relative to the occupied parking space thereby defining a relative location, and determining, using the relative location and time, whether the vehicle has left the occupied parking space.

When such is the case, an inoccupation signal will be generated and transmitted to the parking system database. The inoccupation signal comprises the ID of the occupied parking space and instructions for changing the status of the occupied parking space from occupied to unoccupied (unreserved) (1428) in the parking system database thereby in fact returning the status of the parking space to its original state (unreserved unoccupied (1420)

According to an embodiment, transmission of signals mentioned herein occur over a communication network (private or public). The Internet would be an example of such a communication network.

It should be noted that FIG. 14 shows the reservation period 1430 as being since the initial reservation period which is proposed to the user can be modified (increased or decreased) by him through the user interface if he believes that more or less time that was proposed will be required to travel from the starting location to the selected unreserved reserved parking space.

Similarly, the occupation period 1432 is labeled as such since the initial occupation period which is proposed on the user interface can be modified by the user according to his needs (i.e., the revised occupation period). Also, the occupation period shown on FIG. 14 also encompasses the actual occupation period, which ends when it is determining, using the positioning system of the computing device, that the vehicle has left the occupied parking space.

According yet to another embodiment, when there is no match between the location of the GPS of the computing device and the geo-location of the reserved and unoccupied parking space after a given period (e.g., 7 mins), the status of the parking space will be returned to unreserved and unoccupied without cycling through the occupied status and the occupation period will never occur.

While preferred embodiments have been described above and illustrated in the accompanying drawings, it will be evident to those skilled in the art that modifications may be made without departing from the concept and method of this disclosure. Such modifications are considered as possible variants comprised in the concept and method of this disclosure.

The invention claimed is:

1. A method for reserving a parking space for a vehicle using a computing device having a display, a user interface and a positioning system, the method comprising:

requesting, on the user interface, an unreserved parking space from a plurality of unreserved parking spaces in a parking system database thereby defining a selected unreserved parking space;

computing an estimated travel time from a starting location to the selected unreserved parking space, the starting location being at a distance from the selected unreserved parking space;

based on the estimated travel time, automatically calculating, and proposing on the user interface, an initial reservation period for the selected unreserved parking space;

accepting, on the user interface, the initial reservation period;

upon the accepting, generating and transmitting, from the computing device, a reservation signal to the parking system database, the reservation signal comprising an ID of, and the initial reservation period for, the selected unreserved parking space and instructions for changing a status of the selected unreserved parking space from unreserved to reserved in the parking system database;

proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent;

during the initial reservation period, generating and transmitting, from the computing device, an occupation signal to the parking system database, the occupation signal comprising the ID of the selected reserved parking space and identification of a user account which is associated to the computing device;

comparing, to the location of the selected reserved parking space, a location determined using the positioning system of the computing device on which the user interface was used for accepting the initial reservation period;

determining, from the comparing, whether the vehicle occupies the selected reserved parking space to change the status of the selected reserved parking space from reserved to occupied, wherein said determining uses, as a source of information on occupation to change the status, and only for the selected reserved parking space, the location of the computing device on which the user interface was used for accepting the initial reservation period, said determining being made without the use of fixed sensors for each parking space;

after the status of the selected parking space is changed from reserved to occupied, determining, using the positioning system of the computing device on which the user interface was used for accepting the initial reservation period, a location of the computing device relative to the occupied parking space thereby defining a relative location, and determining, using the relative location and time, whether the vehicle has left the occupied parking space without the use of fixed sensors for each parking space; and after having determined that the vehicle has left the occupied parking space, performing a payment, comprising determining if the user ultimately pays for the selected parking space by determining an account for the payment, further comprising consulting the parking system database to confirm whether the selected parking space is sponsored and, if no, charging payment for the occupation of the selected parking space to the user account identified in the occupation signal, and if yes, debiting payment for the occupation of the selected parking space from a sponsor account being distinct from the user account instead of from the user account, wherein the sponsor account is associated to the ID of the selected parking space, wherein the debiting from the sponsor account is performed regardless of the user account when the selected parking space is sponsored and the user to does not pay the payment.

2. The method of claim 1, wherein the occupation signal comprises instructions for changing the status of the selected reserved parking space from reserved to occupied for an occupation period in the parking system database.

3. The method of claim 1, further comprising accessing, using the computing device, the parking system database to obtain:
a status of parking spaces indicative of:
an occupancy, thereby defining occupied parking spaces and unoccupied parking spaces; and
from the unoccupied parking spaces, a reservation status, thereby defining reserved parking spaces and unreserved parking spaces;
an ID of unreserved parking spaces;
a location of each of the unoccupied parking spaces.

4. The method of claim 1, wherein the initial reservation period is greater than the estimated travel time by a set time margin.

5. The method of claim 4, further comprising providing, on the user interface, an option to select a revised reservation period which is different from the initial reservation period.

6. The method of claim 5, further comprising preventing reservation of a selected unreserved parking space beyond a given threshold period by ensuring that a difference between the revised reservation period and the initial reservation period is not greater than a limit time margin.

7. The method of claim 5, wherein the occupation signal comprising the ID of the selected reserved parking space comprises instructions for changing the status of the selected reserved parking space from reserved to occupied for an occupation period in the parking system database.

8. The method of claim 7, further comprising registering an identity for each of a plurality of vehicles on the parking system database wherein the reservation signal comprises a vehicle identity which is matched to the ID of the selected parking space for which the status is occupied thereby determining, based on the vehicle identity and the ID of the selected parking space, whether a vehicle is parked in the parking space for which it is intended.

9. The method of claim 7, further comprising, after determining that the vehicle has left the occupied parking space, crediting the user account for the time remaining in the occupation period.

10. The method of claim 5, wherein once a grace period passes after the initial reservation period or the revised reservation period, generating and transmitting, from the computing device, an availability signal to the parking system database, the availability signal comprising the ID of the selected reserved parking space and instructions for changing the status of the selected parking space from reserved to unoccupied in the parking system database.

11. The method of claim 5, wherein a set reservation period is smaller than, and finishes at the same time as, the initial reservation period or the revised reservation period, and further wherein the status of the selected reserved parking space is set to unoccupied for occupation by another vehicle until the set reservation period starts.

12. The method of claim 1, further comprising showing an advertisement on the user interface upon confirming that the selected parking space is sponsored.

13. The method of claim 1, wherein the status comprises a reservation status for a future period.

14. A method for reserving a parking space for a vehicle using a web-enabled computing device having a display, a user interface and a positioning system, the method comprising:
showing, on the display, a map taking into account a present location of the web-enabled computing device obtained from the positioning system;
the web-enabled computing device accessing a parking system database to obtain:
a status of parking spaces on the map indicative of:
an occupancy, thereby defining occupied parking spaces and unoccupied parking spaces; and
from the unoccupied parking spaces, a reservation status, thereby defining reserved parking spaces and unreserved parking spaces;
an ID of unreserved parking spaces;
a location of each of the unoccupied parking spaces on the map;
selecting, on the user interface, an unreserved parking space from the unreserved parking spaces thereby defining a selected unreserved parking space;
computing an estimated travel time from a starting location of the web-enabled computing device to the selected unreserved parking space;
based on the estimated travel time, automatically calculating, and displaying on the display, an initial reservation period for the selected unreserved parking space;
accepting, on the user interface, the initial reservation period;
upon the accepting, generating and transmitting, from the web-enabled computing device, a reservation signal to the parking system database, the reservation signal comprising the ID of, and the initial reservation period for, the selected unreserved parking space and instructions for changing the status of the selected unreserved parking space from unreserved to reserved in the parking system database;
proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent;

during the initial reservation period, generating and transmitting, from the computing device, an occupation signal to the parking system database, the occupation signal comprising the ID of the selected reserved parking space and identification of a user account which is associated to the computing device;

comparing, to the location of the selected reserved parking space, a location determined using the positioning system of the web-enabled computing device on which the user interface was used for accepting the initial reservation period;

determining, from the comparing, whether the vehicle occupies the selected reserved parking space to change the status of the selected reserved parking space from reserved to occupied, wherein said determining uses, as a source of information on occupation to change the status, and only for the selected reserved parking space, the location of the web-enabled computing device on which the user interface was used for accepting the initial reservation period, said determining being made without the use of fixed sensors for each parking space;

after the status of the selected parking space is changed from reserved to occupied, determining, using the positioning system of the computing device on which the user interface was used for accepting the initial reservation period, a location of the computing device relative to the occupied parking space thereby defining a relative location, and determining, using the relative location and time, whether the vehicle has left the occupied parking space without the use of fixed sensors for each parking space; and after having determined that the vehicle has left the occupied parking space, performing a payment, comprising determining if the user ultimately pays for the selected parking space by determining an account for the payment, further comprising consulting the parking system database to confirm whether the selected parking space is sponsored and, if no, charging payment for the occupation of the selected parking space to the user account identified in the occupation signal, and if yes, debiting payment for the occupation of the selected parking space from a sponsor account being distinct from the user account instead of from the user account, wherein the sponsor account is associated to the ID of the selected parking space, wherein the debiting from the sponsor account is performed regardless of the user account when the selected parking space that is sponsored and the user does not pay the payment.

15. The method of claim 14, wherein the occupation signal comprises instructions for changing the status of the selected reserved parking space from reserved to occupied for an occupation period in the parking system database.

16. The method of claim 14, wherein the initial reservation period is greater than the estimated travel time by a set time margin.

17. The method of claim 14, further comprising providing, on the user interface, an option to select a revised reservation period which is different from the initial reservation period.

18. The method of claim 14, further comprising showing an advertisement on the user interface upon confirming that the selected parking space is sponsored.

19. The method of claim 14, wherein the status comprises a reservation status for a future period.

20. A non-transitory machine readable medium encoded with instructions that cause a web-enabled computing device having a user interface to perform a method for reserving a parking space for a vehicle comprising the acts of:

receiving a request, on the user interface, an unreserved parking space from a plurality of unreserved parking spaces in a parking system database thereby defining a selected unreserved parking space;

computing an estimated travel time from a starting location to the selected unreserved parking space, the starting location being at a distance from the selected unreserved parking space;

based on the estimated travel time, automatically calculating an initial reservation period for the selected unreserved parking space;

upon receiving an acceptance of the initial reservation period, generating and transmitting a reservation signal, the reservation signal comprising an ID of, and the initial reservation period for, the selected unreserved parking space and instructions for changing a status of the selected unreserved parking space from unreserved to reserved in the parking system database;

proposing on the user interface an initial occupation period, wherein the initial occupation period is the period which is proposed for occupation of the parking space by the vehicle and further wherein the initial reservation period ends when the initial occupation period begins whereby the initial reservation period and the initial occupation period are not concurrent;

during the initial reservation period, generating and transmitting, from the computing device, an occupation signal to the parking system database, the occupation signal comprising the ID of the selected reserved parking space and identification of a user account which is associated to the computing device;

comparing, to the location of the selected reserved parking space, a location determined using the positioning system of the web-enabled computing device on which the user interface was used for accepting the initial reservation period;

determining, from the comparing, whether the vehicle occupies the selected reserved parking space to change the status of the selected reserved parking space from reserved to occupied, wherein said determining uses, as a source of information on occupation to change the status, and only for the selected reserved parking space, the location of the web-enabled computing device on which the user interface was used for accepting the initial reservation period, said determining being made without the use of fixed sensors for each parking space;

after the status of the selected parking space is changed from reserved to occupied, determining, using the positioning system of the computing device on which the user interface was used for accepting the initial reservation period, a location of the computing device relative to the occupied parking space thereby defining a relative location, and determining, using the relative location and time, whether the vehicle has left the occupied parking space without the use of fixed sensors for each parking space; and after having determined that the vehicle has left the occupied parking space, performing a payment, comprising determining if the user ultimately pays for the selected parking space by determining an account for the payment, further comprising consulting the parking system database to confirm whether the selected parking space is sponsored and, if no, charging payment for the occupation of the selected parking space to the user account identified in the occupation signal, and if yes, debiting payment for the occupation of the selected parking space from a sponsor account being distinct from the user account instead of from the user account, wherein the sponsor account is associated to the ID of the selected parking space, wherein the debiting from the sponsor account is performed regardless of the user account when the selected parking space that is sponsored and the user does not pay the payment.

* * * * *